INVENTOR
Elwin A. Hawk
BY Evans + McCoy
ATTORNEYS

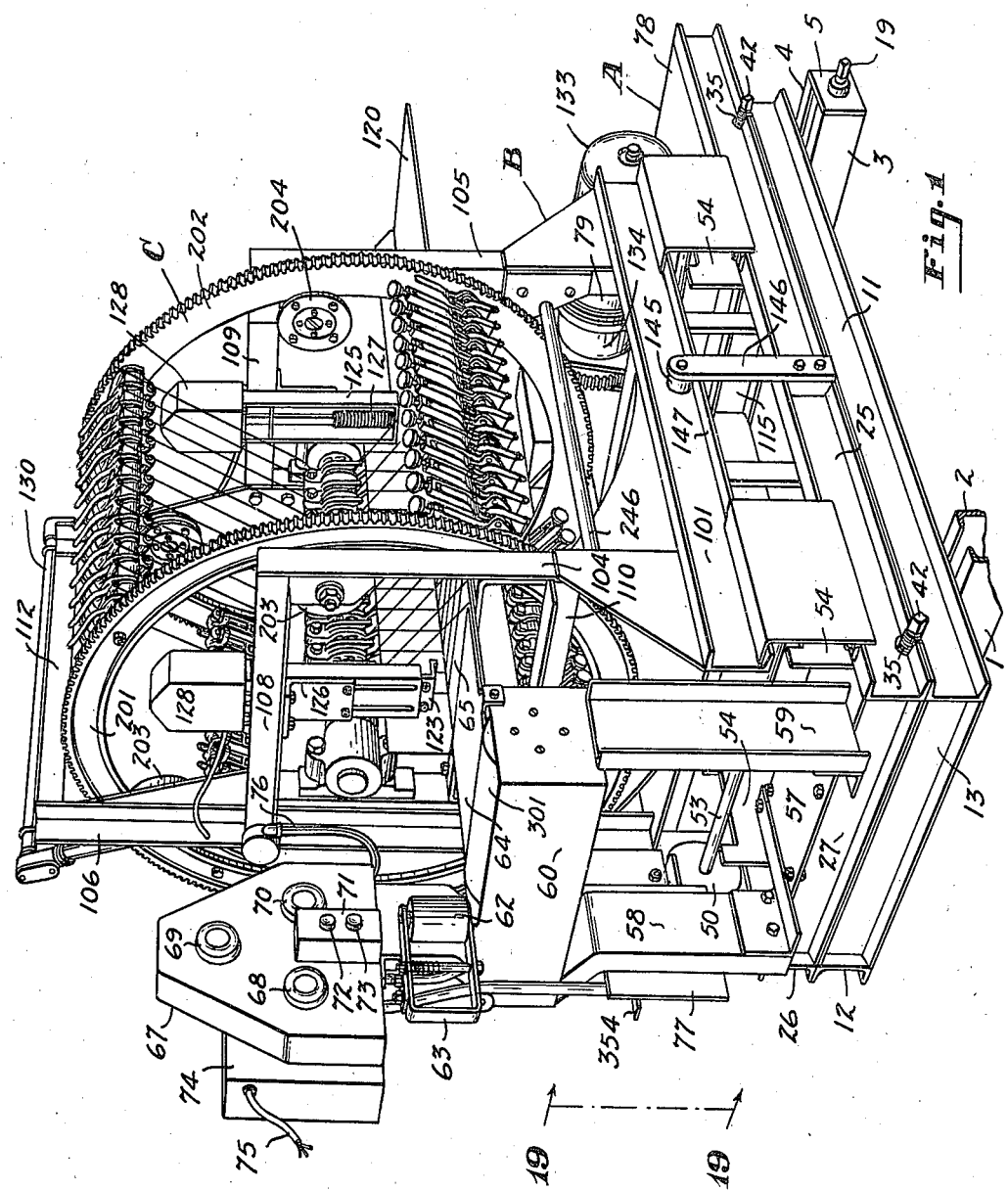

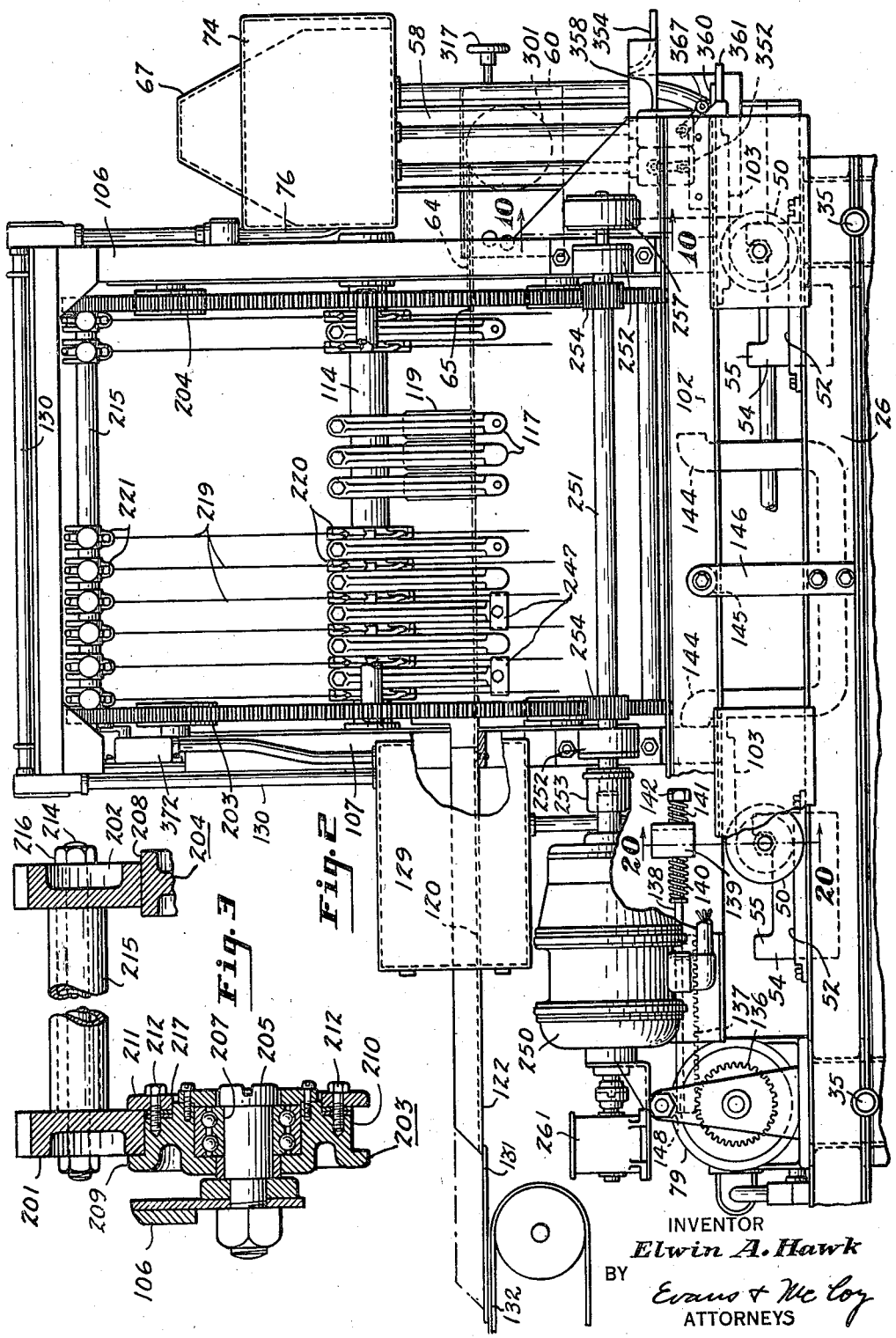

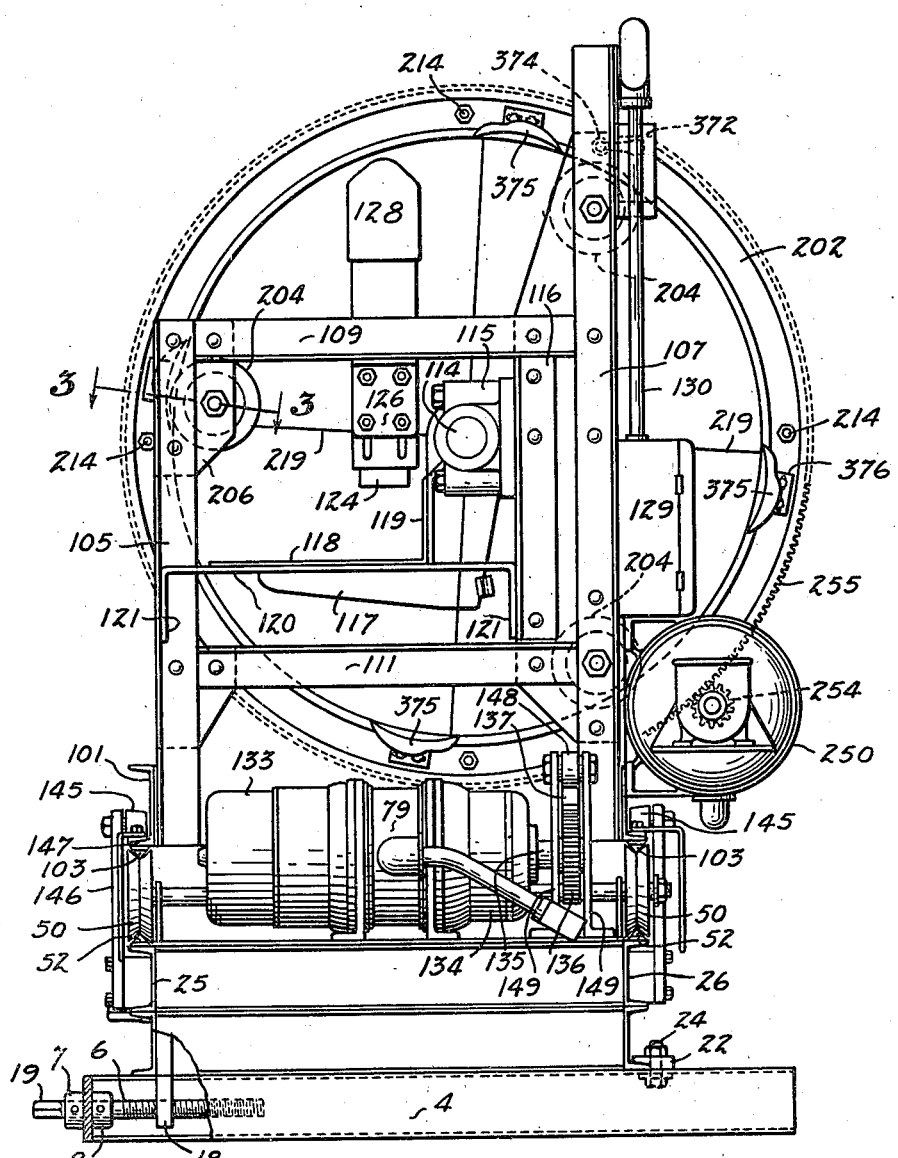
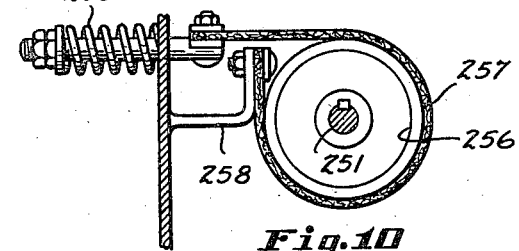

Nov. 4, 1941.　　　　E. A. HAWK　　　　2,261,114
CLAY CUTTING MACHINE AND METHOD OF CONTROL
Filed Jan. 7, 1938　　　　10 Sheets-Sheet 5
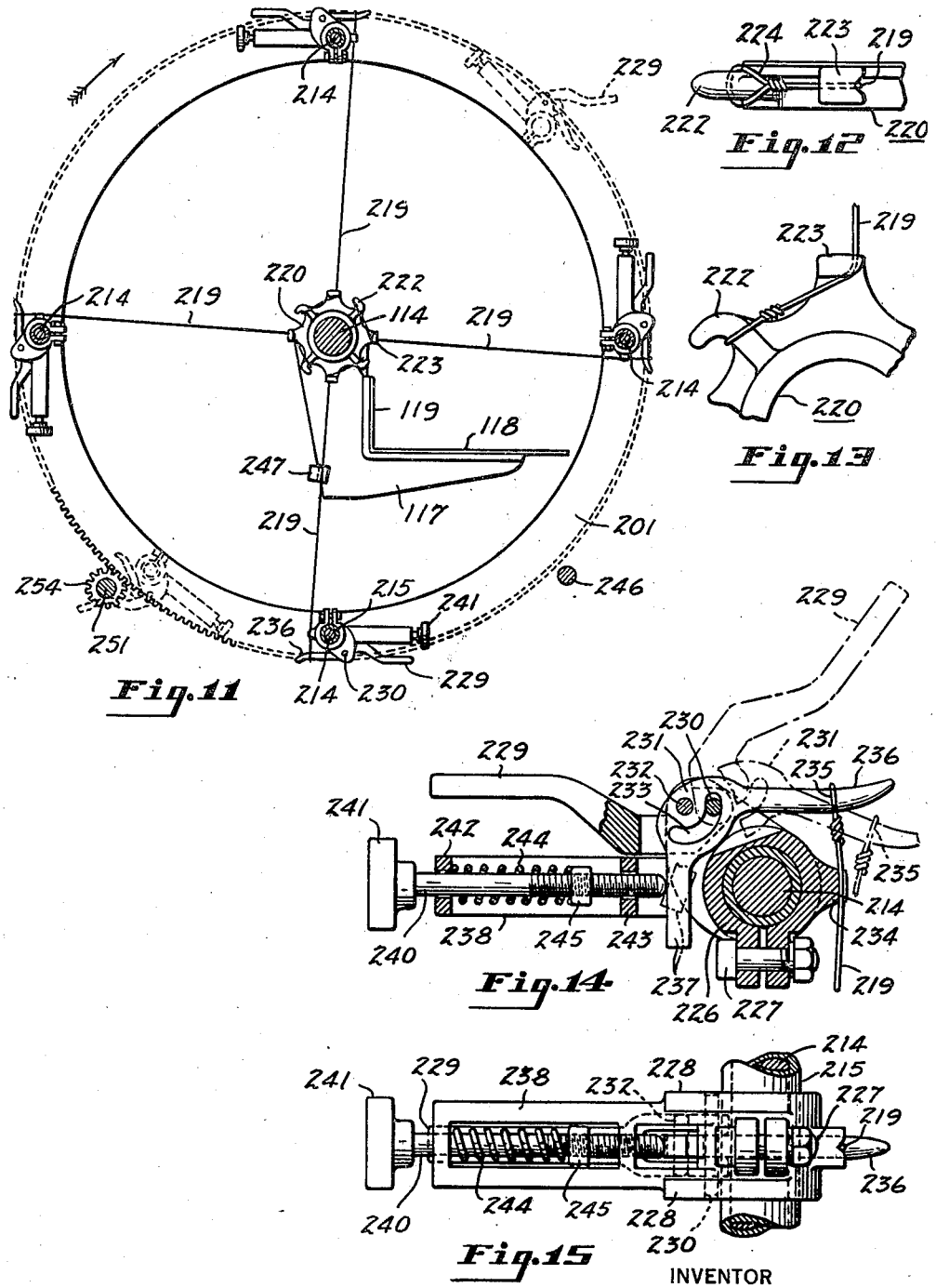
INVENTOR
*Elwin A. Hawk*
BY
Evans & McCoy
ATTORNEYS

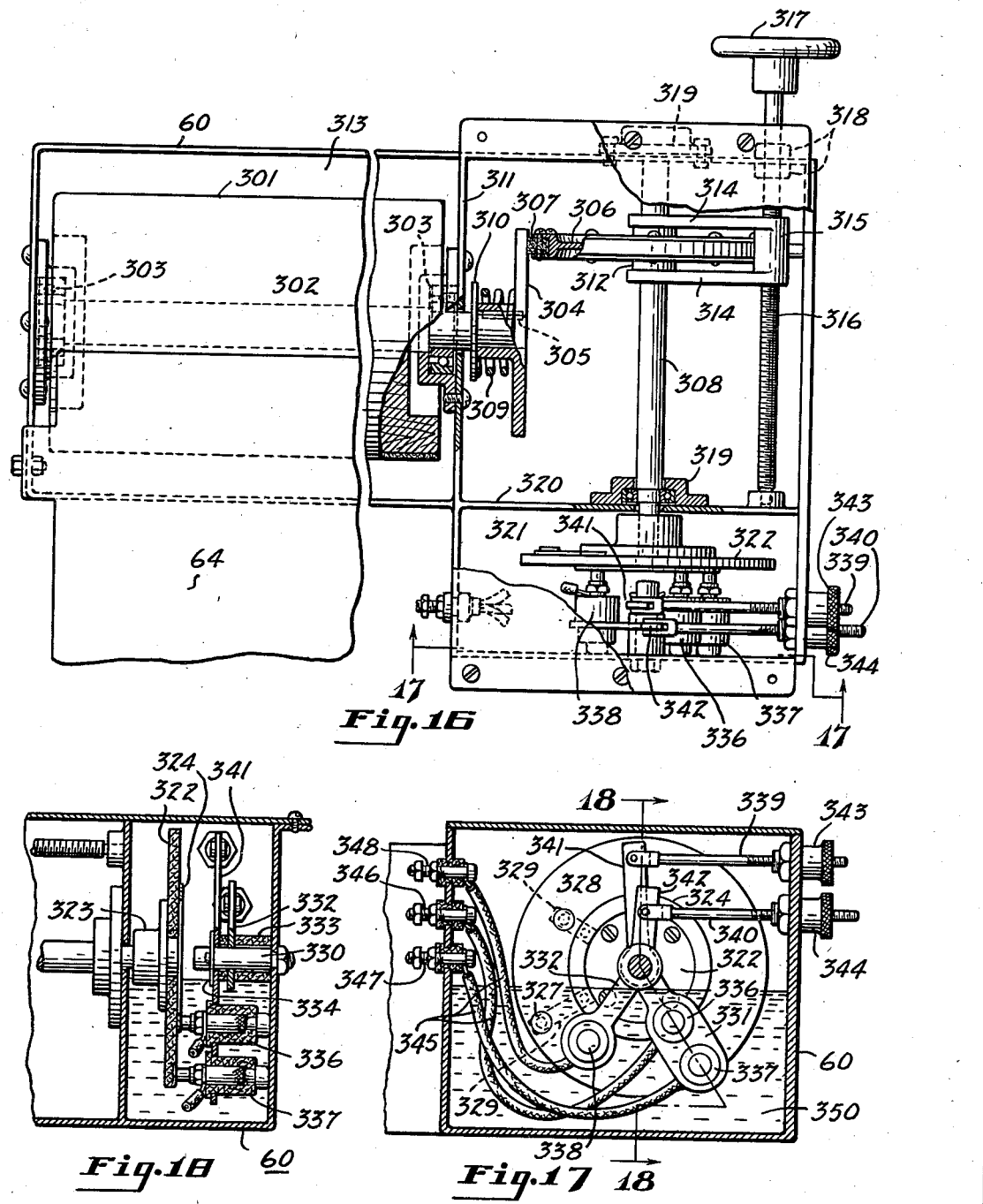

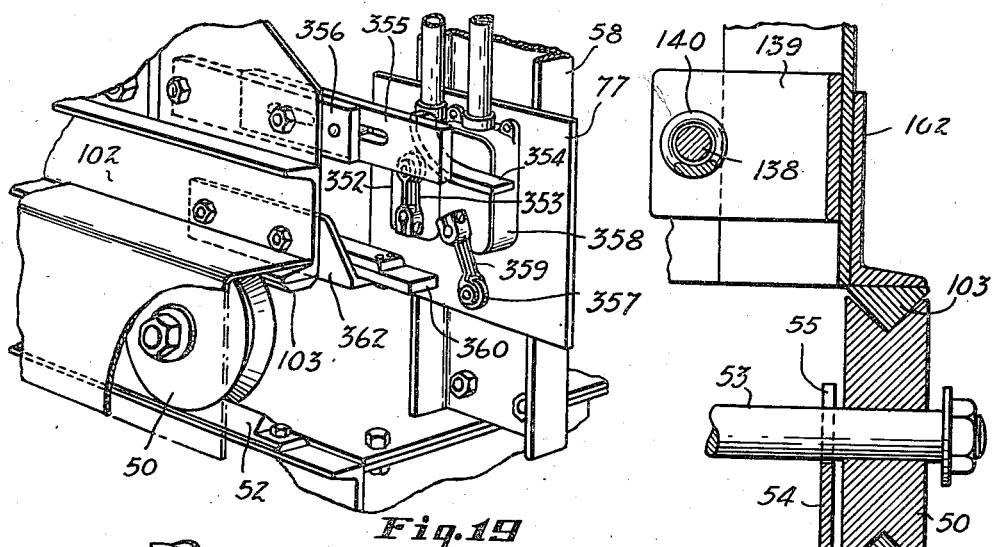

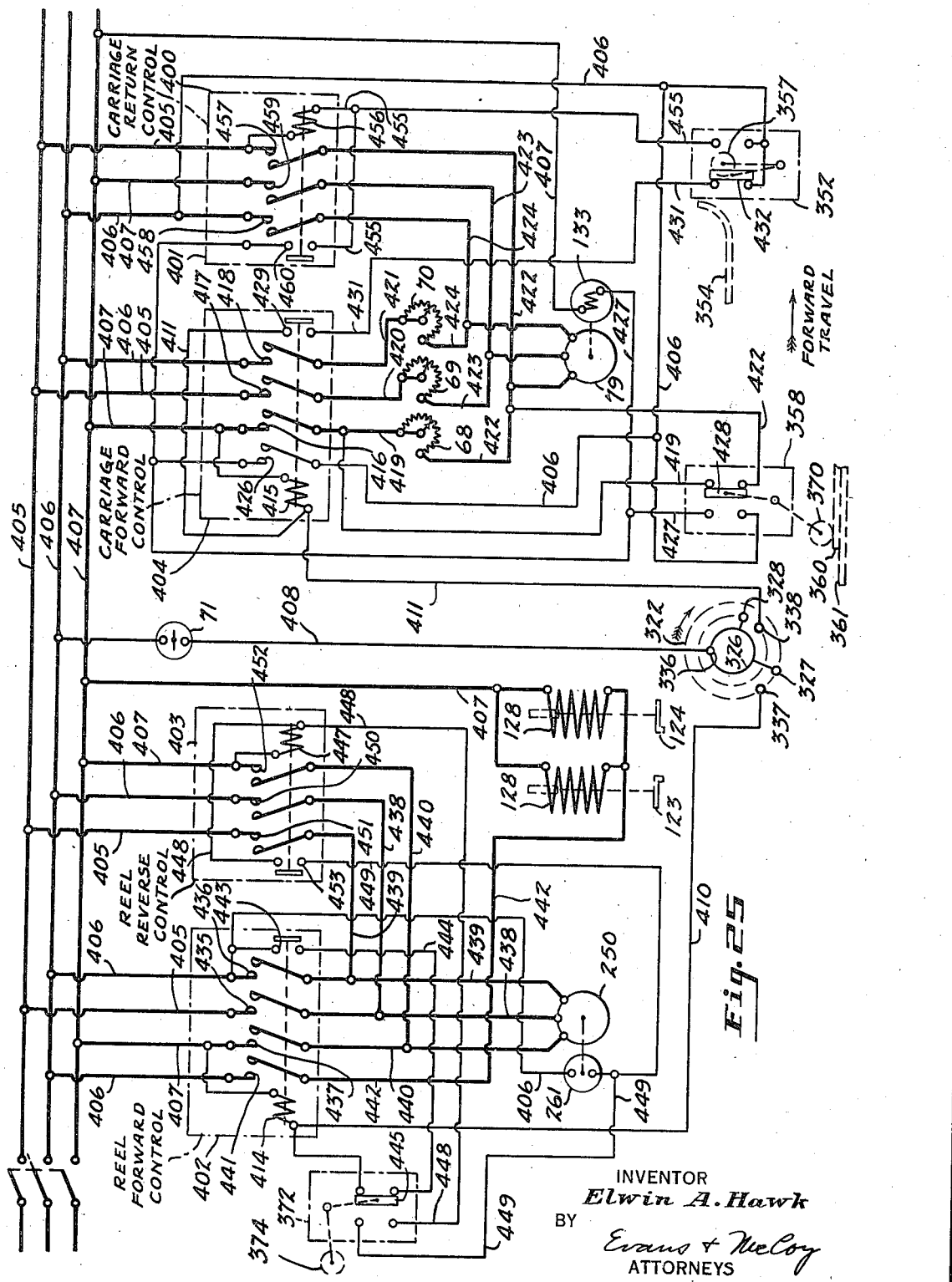

INVENTOR
Elwin A. Hawk
BY Evans + McCoy
ATTORNEYS

Nov. 4, 1941.    E. A. HAWK    2,261,114
CLAY CUTTING MACHINE AND METHOD OF CONTROL
Filed Jan. 7, 1938    10 Sheets-Sheet 10
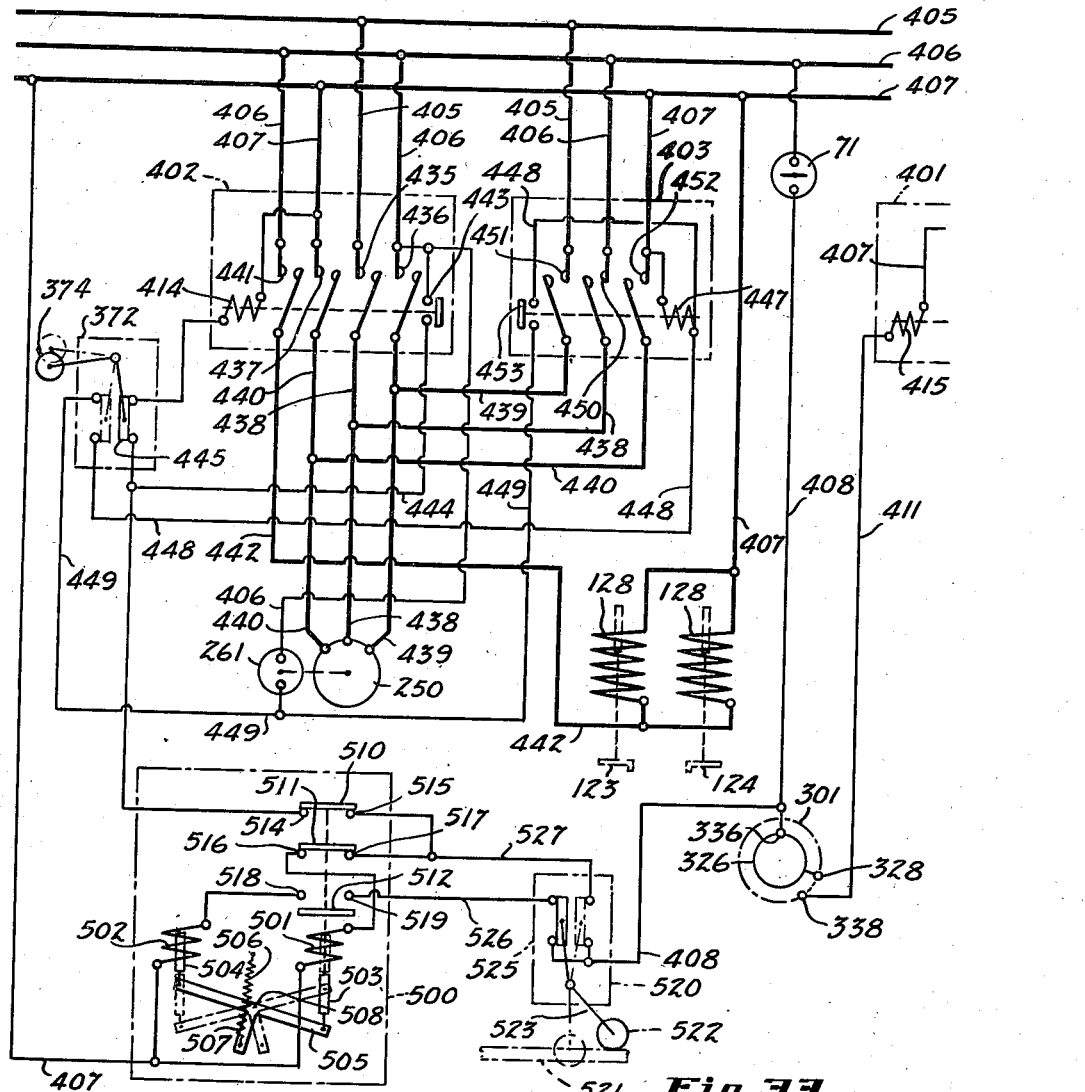
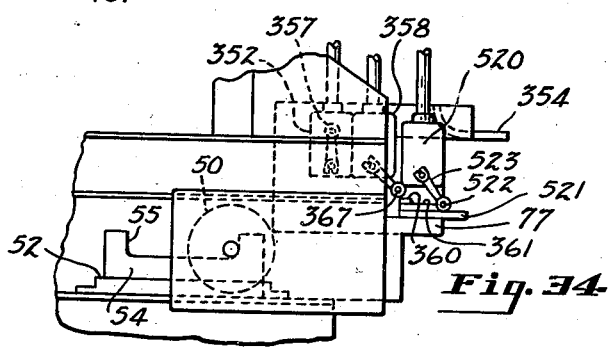
INVENTOR
Elwin A. Hawk
BY
Evans + McCoy
ATTORNEYS Patented Nov. 4, 1941

2,261,114

UNITED STATES PATENT OFFICE 2,261,114

CLAY CUTTING MACHINE AND METHOD OF CONTROL

Elwin A. Hawk, Canton, Ohio

Application January 7, 1938, Serial No. 183,845

26 Claims. (Cl. 25—109)

This invention relates to machines for cutting plastic material, such as clay and the like, and more particularly to a method and apparatus for cutting a moving clay body, such as a column of clay issuing from an extruding machine, in the manufacture of bricks, tile and similar articles.

An object of the invention is to improve the construction and operation of machines of this character and to provide a machine which cuts a moving column of clay with greater uniformity and precision.

Numerous difficulties are encountered in attempting to synchronize a clay cutting machine with the movement of a clay column issuing from the orifice of an extruding machine or auger. On account of differences in plasticity and density the column does not move with uniform speed, so that a cutting machine to be properly synchronized with the moving column cannot operate at a constant uniform speed, and it is desirable to synchronize the operation of the cutting machine so that it adapts itself to the variations in the clay column movement.

The type of brick cutting machine which has a reciprocable carriage, provided with supporting means to receive a continuously moving column of clay issuing from an auger, is well known. Such machines employ a rotatable reel on the carriage for carrying a number of cutting wires. After receiving a suitable length of clay column the carriage moves with the clay column while the reel is rotated to draw the wires through the clay. The carriage then slides longitudinally under the column to starting position, where it remains until another length of clay column is positioned on the carriage and the cycle is repeated. A machine of this character, constructed in accordance with the present invention, has numerous features and incorporates a novel control arrangement.

One improvement in clay cutting machines, which is a feature of the present invention, is the provision of means for energizing the movement of the carriage during the work stroke while the cutting of the clay column takes place. Other features relate to control means responsive to the travel of the clay column for starting the movement of each work stroke of the carriage and the rotation of the cutting reel, means for adjusting the size of the waste slab of clay for each cutting operation, and means for stopping the movement of the carriage at each end of its path with a minimum of shock, and without requiring the use of bumpers or stops, thus reducing wear and damage or injury to the mechanism. Features particularly relating to the cutting reel include control means for permitting the inertia of the reel to complete the cutting operation and means for arresting the rotative movement of the reel without the use of mechanical stops, thus accomplishing smoother operation and reducing wear and injury to the mechanism. Additionally, improved wire holders are provided and broken cutting wires may be replaced on the reel during continuous operation of the machine.

Other objects and advantages will appear from the following detailed description of a machine for cutting bricks, which is an illustrative embodiment of the invention.

In the drawings,

Figure 1 is a perspective view of the cutting machine, at the infeed end, showing the location of the measuring roll;

Fig. 2 is a rear elevational view of the machine;

Fig. 3 is a fragmentary detail view, in section, showing the construction of the guide wheels for mounting the reel;

Fig. 9 is an elevational view, with parts broken away, showing the discharge end of the machine;

Fig. 10 is a fragmentary detail view, partly in section, showing the construction of the cutting reel brake, and taken substantially on the line 10—10 of Fig. 2;

Fig. 11 is a diagrammatic showing of an end view of the cutting reel, illustrating the wire holding means;

Fig. 12 is a fragmentary detail of the central wire holding ring;

Fig. 13 is a side view of the portion of central wire holding ring illustrated in Fig. 12;

Fig. 14 is an assembly view of one of the adjustable wire holders mounted on the cutting reel periphery;

Fig. 15 is a bottom view of the wire holder illustrated in Fig. 14;

Fig. 16 is a detail plan view, partly in section and with parts removed, showing the measuring roll and associated timing mechanism;

Fig. 17 is a vertical sectional view, with parts removed, taken substantially on the line 17—17 of Fig. 16;

Fig. 18 is a vertical detail view, in section and with parts removed, taken substantially on the line 18—18 of Fig. 17;

Fig. 19 is a detail view, in perspective, indicated by the line 19—19 of Fig. 1, showing the limit switches for controlling the movement of the carriage;

Fig. 20 is a vertical sectional detail, taken substantially on the line 20—20 of Fig. 2, showing the manner of mounting the carriage on the base and the drive for the carriage;

Fig. 21 is a fragmentary detail view, in section, showing the action of the reversing cam on the carriage in actuating the reversing limit switch;

Fig. 22 is a fragmentary detail view, in section, showing the action of the forward movement cam on the forward movement limit switch;

Fig. 23 is a fragmentary detail view illustrating the action of one of the reel cams on the reel control limit switch;

Fig. 24 is a sectional detail view taken substantially on the line 24—24 of Fig. 23;

Fig. 25 is an electrical wiring diagram showing the connections for controlling the machine;

Figure 26:
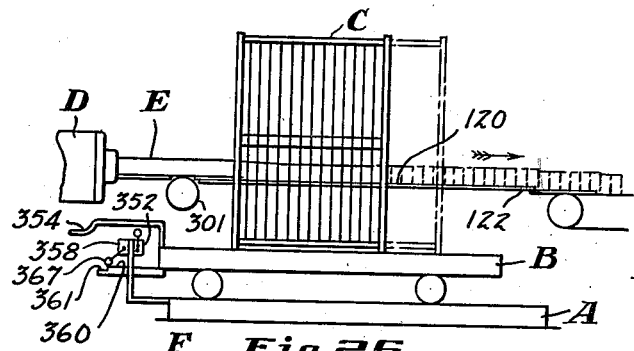
Figs. 26, 28, 30 and 32 are diagrammatic side elevational views illustrating the machine at various stages of a working cycle.
Figure 27:
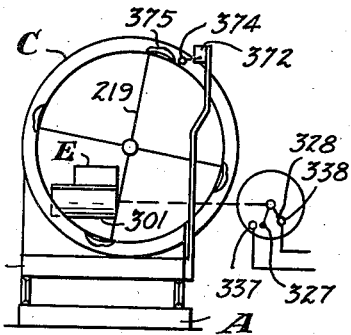
Figure 28:
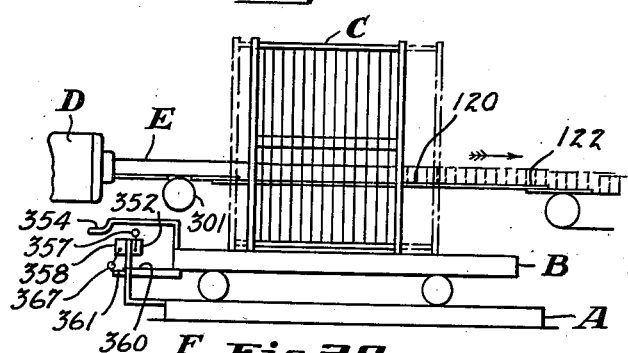
Figure 29:
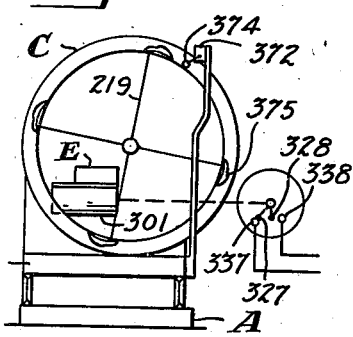
Figure 30:
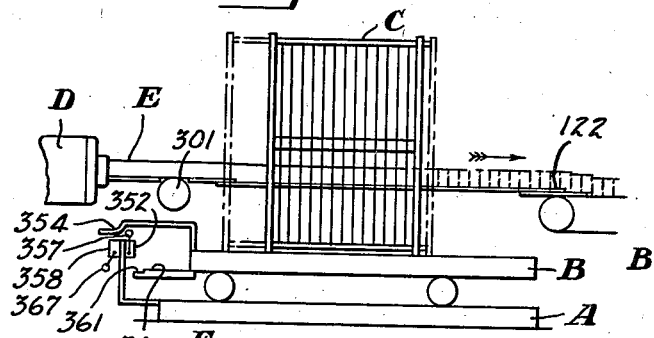
Figure 31:
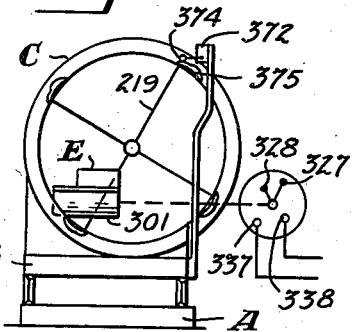

Figs. 27, 29, and 31 are diagrammatic and elevational views showing the relative position of the reel corresponding to the positions of the carriage illustrated, respectively, in Figs. 26, 28, and 30.

Fig. 33 is a wiring diagram and diagrammatic showing of a modified control system for the cutting mechanism; and Fig. 34 is a fragmentary elevational detail of the corner of the machine illustrated in Fig. 19, showing the mounting of the limit switch used in the modification of Fig. 33.

Referring to the drawings by numerals of reference, which indicate like parts throughout the several views, the brick cutting machine embodying the invention comprises a base, indicated generally by the letter A, and the parts of which are numbered below 100, a carriage having parts numbered in the 100's, reciprocably mounted on the base and indicated generally by the letter B, and a cutting reel, numbered in the 200's, rotatably mounted on the carriage, and indicated generally by the letter C. The control mechanism and other parts of the machine not numbered as indicated above are assigned numbers in the 300's, and the wiring for the electrical control system is identified by numbers in the 400's.

The base A includes supports disposed transversely of the direction of movement of clay column E issuing from extruder machine D. The support under the receiving end of the machine comprises channel members 1 and 2, and the support under the discharge end of the machine comprises channel members 3 and 4. The channels comprising each transverse support are disposed a slight distance apart in parallel relation with one another, and are preferably secured to a suitable foundation for the machine in any well known manner. The channels of each support have a thrust plate 5 secured across one end and receive between them threaded thrust rods 6. These rods are rotatably received in openings in the thrust plates 5 and are secured against longitudinal movement by collars 7 and 8 disposed on opposite sides of the thrust plates.

Resting on the supports is a base standard, which comprises a bottom frame having longitudinally extending channel members 11 and 12, arranged in spaced parallel relation and having their ends joined by pairs of cross members. Cross members 13 and 14 are at the receiving end of the machine, and cross members 15 and 16 are at the discharge end of the machine. Brackets 18 are secured to the longitudinal member 11 and depend between the support members at opposite ends of the base. These brackets are threadedly received on the inner ends of the thrust rods 6, and outer square ends 19 of the thrust rods, projecting beyond the supports, receive a turning lever 20. Upon rotation of the thrust rods 6 by means of the lever 20 the longitudinal members 11 and 12 of the machine base may be moved laterally as a unit over the transverse supports, thus affording lateral adjustment of the machine with respect to the foundation upon which it is carried. The machine, when so adjusted, may be locked in position by clamping devices illustrated in Figs. 5 and 7, which secure the longitudinal channel member 12 to the supports. These clamps comprise top and bottom plates 22 and 23, respectively, and bolt 24. The bottom plate 23 extends underneath the flanges of the support channel members, and the top plate overlies the bottom flange of the channel member 12, so that tightening of the bolt 24 compresses the channel 12 against the top of the transverse support channels, thus securing the base in adjusted position. Adjustment of the machine is accomplished by loosening the bolts 24 to release the clamps and rotating either one or both of the thrust rods 6 in the proper direction to move the machine laterally over the supports to the desired position, after which the clamps are tightened in position.

Figure 6:
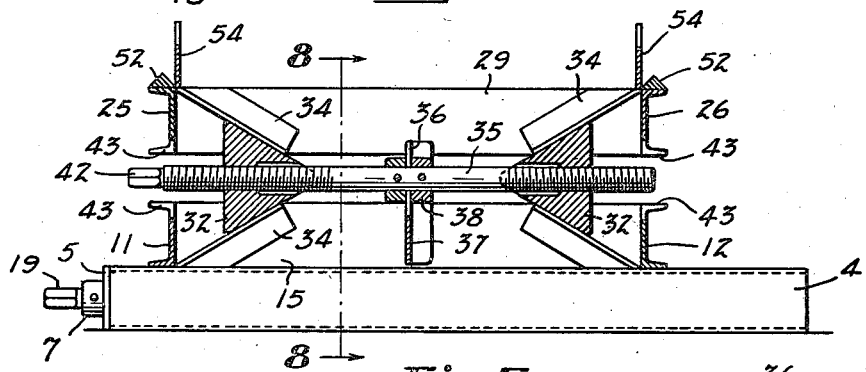
Fig. 6 is a view similar to Fig. 5, showing the position of the parts of the base when the carriage is elevated.
Figures 7, 8:
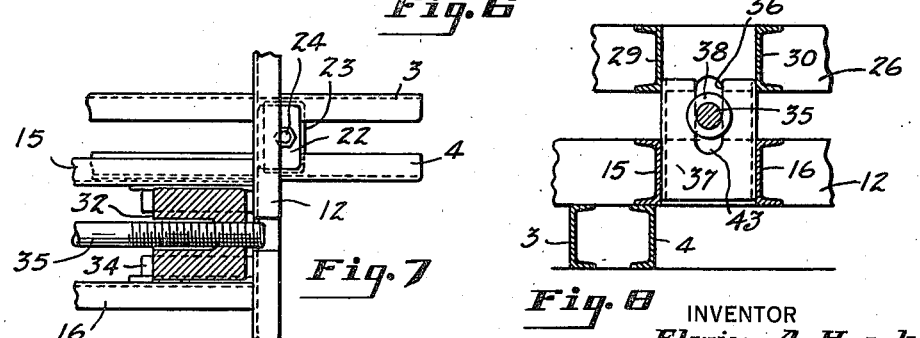
Fig. 7 is a horizontal sectional detail, taken substantially on the line 7—7 of Fig. 5.
Fig. 8 is a vertical sectional detail, taken substantially on the line 8—8 of Fig. 6.

Surmounting the bottom frame of the base standard is a top frame, comprising longitudinally extending channel members 25 and 26 corresponding to the channels 11 and 12, respectively, and cross members 27 and 28 at the receiving end, and cross members 29 and 30 at the discharge end. A wedge mechanism for raising or lowering either one or both ends of the carriage of the machine is provided in the construction of the base standard. This wedge arrangement is described for only the discharge end of the machine, it being understood that the construction at the receiving end is substantially the same and functions in the same manner. The cross channel members 15 and 16 of the bottom standard frame are arranged in spaced, parallel, back-to-back relation with one another, and a suitable distance apart to guide the movement of wedge blocks 32. The cross channel members 29 and 30 of the top standard frame are arranged in overlying parallel relation, and substantially flush with the channels 15 and 16, respectively, and also guide the wedge blocks. Secured to the opposed webs of the cross members are angularly disposed bearing plates 34 which have sliding engagement with the surfaces of the wedge blocks. The bearing plates secured to the bottom standard support the wedge blocks, and the bearing plates of the top frame rest on the wedge blocks. The wedge blocks are guided between the cross members of the base standard and are carried on oppositely threaded ends of a shaft 35 received in a vertical slot 36 of guide plate 37 secured between the bottom frame cross members 15 and 16 (Fig. 8). These plates 37 extend upwardly between the cross members 29 and 30 of the standard top frame, thus assisting in preventing longitudinal movement of one frame with respect to the other. Collars 38 and 39 are secured on shafts 35 on opposite sides of the guide plates 37 and resist longitudinal movement of the oppositely threaded shaft. Squared ends 42 of the shafts 35 are provided to receive a suitable crank or turning handle so that the shafts may be rotated to separate or draw together the wedge blocks 32 and 33, thus lowering or raising the carriage. Vertical movement of the shafts 35 when raising or lowering the carriage is permitted by the slot 36 in the guide plates 37. When the wedge blocks are drawn together, as shown in Fig. 6, the top frame of the standard is raised and separated from the bottom frame member. The wedge blocks serve to aline the top frame of the standard above the bottom frame, so that these two parts of the base do not shift laterally or longitudinally with respect to one another during operation of the machine.

Figure 4:
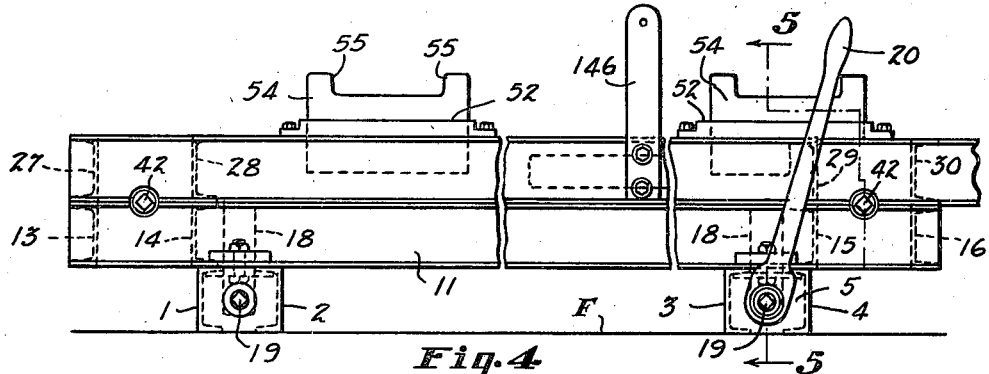
Fig. 4 is a detail view, with parts removed, of the machine base.
Figure 5:
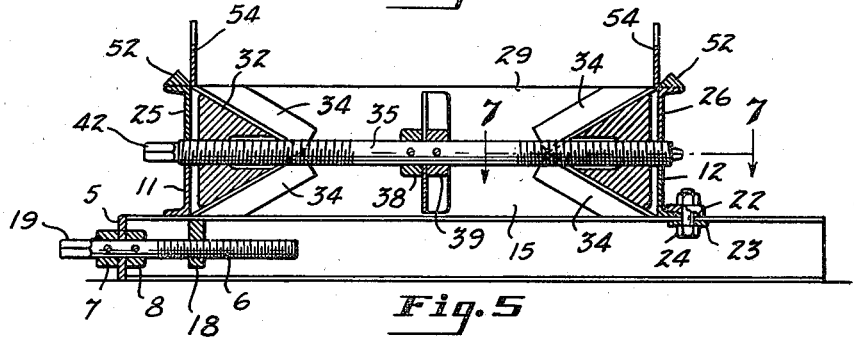
Fig. 5 is a detail, in section, showing the mechanism for raising and lowering the carriage, and taken substantially on the line 5—5 of Fig. 4.

In the lowered position of the top frame standard shown in Figs. 4 and 5, the bottom flanges of the channel members of the top frame rest on the top flanges of the channel members of the bottom frame. Cut-away portions 43 (Fig. 6) in the longitudinal members of the standard frames are provided to receive the ends of the shafts 35.

In adjusting the machine, such as for different sizes of clay column, it may be desirable to raise or lower only one end of the carriage or to raise one end and lower the other. Such adjustment is provided since the wedge blocks at the infeed end of the machine are independent of the wedge blocks at the discharge end of the machine. Similarly, one end of the machine may be moved laterally independently of the opposite end of the machine since the thrust shaft 6 at the infeed end is independent of the thrust shaft 6 at the discharge end. Furthermore, these lateral and vertical adjustments may be made while the machine is in continuous operation, if desired.

The carriage B is supported by wheels 50 (Fig. 20) having peripheral V-shaped grooves 51. The wheels ride on V-shaped tracks 52 secured on the top flanges of the longitudinal channel members of the top frame of the base standard. Preferably the V-angle of the wheels is slightly greater than the V-angle of the tracks to reduce frictional resistance to rolling of the wheels and insure centering on the tracks. A pair of the wheels 50, at each end of the machine, is journaled on a shaft 53. One of the wheels of each pair is secured against rotation on the shaft and the other wheel is freely rotatable and longitudinally slidable on the shaft, as shown in Fig. 20. In this manner slight misadjustment of tracks on opposite sides of the machine is compensated and wear on the shafts and wheels minimized. To prevent the wheels from overrunning the tracks, stop plates 54 (Fig. 2) are secured to the longitudinal members 25 and 26 of the top standard frame, in parallel relation with the tracks. Central portions cut away from the top marginal edges of the plates 54 provide upstanding stops 55, disposed in the path of the shafts 53. The wheels 50 and shafts 53 are not connected to either the base or carriage, and, in effect, float therebetween so that the stop plates 54 serve to prevent dislodgment of the wheels and maintain the shafts in parallel relation.

At the receiving end of the machine the top frame members 25 and 26 of the base standard carry between them a platform 57 which has mounted thereon a pair of upright members 58 and 59, which support a housing 60 for the measuring roller and controls to be later described. The member 58 extends above the housing 60 and carries an oiling roller 62 journaled in a yoke 63, mounted for movement about a vertical pivot and arranged to resiliently bear against the vertical side of the clay column E moving onto the platens of the carriage. The casing 60 has secured thereto a clay supporting apron 64 which overrides a receiving platen 65 of the carriage. The apron 64 and receiving platen 65 are telescopically arranged so that the clay column is continuously supported during reciprocation of the carriage B.

A casing 67 is carried at the top of the upright 58 and houses three adjustable or variable rheostats 68, 69 and 70 for controlling the energization of the carriage motor during the work stroke in a manner to be hereinafter described. On the front of the housing 67 is mounted a switch 71 for opening and closing the electric circuit for the machine through start button 72 and stop button 73. Behind the rheostat casing 67 is mounted a panel box 74 which contains the magnetic control switches or relays controlling the carriage drive motor. A panel plate 77 is secured to the upright 58 to carry control limit switches to be later described. The power for running the machine may be supplied in accordance with well known practice. Although the invention is adaptable to either alternating or direct current the description is directed to a three-phase alternating current installation having a main power lead indicated at 75. Electrical conduits leading to the carriage are contained in a flexible conduit 76. At the discharge end of the machine a platform 78 is supported between the longitudinal members 25 and 26 of the base and carries carriage drive motor 79.

The carriage comprises a pair of spaced parallel longitudinally extending chassis members 101 and 102 which overlie the longitudinal members 25 and 26, respectively, of the top standard frame. The members 101 and 102 have tracks 103 (Fig. 20) secured along their bottom flanges. These tracks correspond to the tracks 52 on the base of the machine and seat in the grooves 51 of the wheels 50.

Uprights 104 and 105 are secured to the chassis member 101, and similar uprights 106 and 107, of greater height, are secured to the chassis member 102. Top tie member 108 joins the top of the upright 104 at the infeed end of the carriage to the upright 106, and top tie member 109 joins the top of the upright 105 to upright 107. Intermediate tie members 110 and 111 join the uprights 104 and 106 and the uprights 105 and 107, respectively, below the tie members 108 and 109. Also, tie member 112 joints the extremities of the uprights 106 and 107.

A fixed shaft 114 extends longitudinally through the carriage and is mounted in brackets 115 secured to members 116 carried between the top and intermediate tie members at the infeed and discharge ends of the carriage. Secured along the shaft 114 are platen brackets 117 (Fig. 2), which carry horizontal platens 118 and vertical platens 119 for supporting and guiding the clay column during its movement through the machine, and between which the cutting wires pass upon rotation of the reel. Panel box 129 mounted on the carriage houses the magnetic control switches for the reel drive motor and conduits 130 carry the electric wire between the various control instrumentalities of the machine.

A discharge apron 120 (Fig. 9) extends as a continuation of the horizontal platens 118 and is carried by cross member 121 secured between uprights 105 and 116. This apron is loosely connected to the member 121 to provide limited vertical movement at its free end 122 which overlies a stationary table or plate 131 and has sliding engagement therewith. The plate 131 closely overlies and is in parallel relation with a take-off conveyor 132 which may be of the endless belt type, as shown, and which receives the bricks from the machine. During reciprocation of the carriage B, the apron 120 slides back and forth telescopically over the table 131 and a continuous supporting surface is provided for the bricks.

Clamps 123 and 124, disposed at the infeed and discharge ends, respectively, of the carriage, are mounted in housings 125 adjustably secured to the top tie members 108 and 109 by brackets 126. These clamps are normally held in retracted position by springs 127 and are forced downwardly upon energizing electric solenoids 128. During the cutting operation the clamps assist in preventing relative movement between the traveling clay bar and the carriage. Additionally, if such movement should occur, the clamps score or mark the top surface of the bar or column so that the operator is immediately advised of the fact by visual observation and can regulate the power supplied to the carriage during the work or cutting stroke by means of the rheostats, as will later be described, thus establishing perfect synchronization between the bar and carriage.

A magnetic brake 133 (see Fig. 9) and a reduction gearing 134 are mounted on the carriage drive motor 79. The brake 133 is of the disc type, which acts on the motor shaft and is self-actuating, that is, it normally has a braking action on the motor unless energized to effect a release of the brake. In the present instance the release is accomplished by an electro-magnetic solenoid (not shown).

Shaft 135 from the reduction gearing 134 carries a gear 136 which meshes with a floating rack 137 (see Figs. 2 and 9), secured to a bar 138 which is loosely carried in a bracket 139 (Fig. 20), secured to a frame member of the carriage. Compression springs 140 and 141 are carried on the bar 138 and engage the bracket 139, the latter spring being secured in place by nut 142 which is threaded on the bar 138. The springs 140 and 141 permit slight longitudinal movement of rack 137 and bar 138 with respect to the bracket 139 and serve as shock absorbers between the carriage B and carriage drive motor 132.

Roller 148 rides on the top of the bar 138 to keep the rack 137 in mesh with drive gear 136 and is mounted between brackets 149 which also journal the shaft for the gear 136. The rack 137 is arranged of such length that when the carriage is at its limit of movement the end teeth of the rack are meshed with the gear 136 so that continued rotation of the gear compresses one of the springs and the rack teeth ratchet on the gear 136, thus preventing injury to the mechanism.

Mechanical stops 144 are secured to the longitudinal frame members 25 and 26 of the base and are engageable with the uprights of the carriage to limit movement of the latter. Hold-down rollers 145 (Figs. 1 and 9) are carried by arms 146 secured to the top frame members 25 and 26 and ride on horizontal flanges 147 of chassis members 101 and 102 of the carriage, thus preventing the carriage from being raised off the wheels 50.

The cutting mechanism mounted on the carriage may be one of several well known types such as rotary reel or reciprocating cradle. In the embodiment illustrated the cutters are radially mounted on a rotatable reel which comprises a pair of spaced parallel gear rings 201 and 202 carried, respectively, at the infeed and discharge ends of the carriage by rollers 203 and 204, journaled on stub shafts 205. Upright 106 and plate 206 secured to upright 104 carry the stub shafts for rollers 203 and the shafts 205 for the rollers 204 at the discharge end of the machine are carried by upright 107 and plate 206 secured to upright 105. The rollers 203 and 204 are carried on ball bearing races 207 and engage the inner peripheral edges of the rings 201 and 202. The rollers 204 have a substantially cylindrical, ring-engaging surface, indicated at 208 of Fig. 3 while the rollers 203 have an annular, radially directed flange 209 formed at one edge of a cylindrical ring engaging surface 210 and an adjustable, radially directed ring flange 211 secured at the other edge by studs 212.

The ring gears 201 and 202 are secured together by tie rods 214 which pass through tubular spacing and wire carrying members 215. The spacing members abut against the opposed faces of the ring gears and the tie rods 214 have threaded extremities which pass through suitable holes in the ring gears and receive nuts 216. Thus, the ring gears are maintained in their corelative position with respect to one another and longitudinal movement of the reel is prevented by the flanges 209 and 211 on the rollers 203. Adjustment of the space between the flange 209 and ring flange 211 is provided by shims 217 which can be removed as wear occurs, thus insuring a snug fit between the roller flanges and ring gear 201 to prevent endwise movement of the reel.

The mounting for the reel described above is a particular feature of the invention and affords a construction which permits expansion and contraction of the reel as a whole, without objectionable binding or looseness, so that the cutting operations performed by the wires carried by the reel are uniform and accurate. This is accomplished by restraining longitudinal movement of the reel solely at one of the gear rings. Additionally, the roller flanges prevent shifting of the reel axis, thus maintaining a more uniform cutting action.

Cutting wires 219 (see Fig. 11) are stretched between central wire holding spiders or rings 220 carried on fixed shaft 114 and wire holders 221 carried on the spacing members 215. In the machine illustrated, four sets or banks of clay cutting wires are provided and are spaced at substantially 90° from one another. As is well known, however, a different number of cutting wire banks may be employed, such as three or five, depending upon the characteristics of the clay to be cut and the shape and size of the product being manufactured. The spacing and arrangement of the wires, which may be increased or decreased in number, as desired, is in accordance with established practice in the brick making art.

The spider rings 220 (see Figs. 12 and 13) have radially directed hooks 222 and guide lugs 223 for each wire. The end of each cutting wire at the center of the reel is formed with a loop 224 which is received over one of the hooks 222. The wire is then carried circumferentially about the spider 220 and under an overhanging projection on the next adjacent guide lug, from which the wire extends in a radial direction to one of the wire holders 221. These wire holders are of unique construction (see Figs. 14 and 15) and comprise a body portion 226 which embraces one of the spacing members 215 and is clamped thereon by bolt 227. A pair of spaced parallel ears 228 are formed on the body 226 and receive between them the bifurcated end of a lever 229 which is carried on a pivot pin 230 journaled in the ears 228. Disposed between the prongs of the bifurcated lever 229, and accordingly between the ears 228, is a bell crank lever 231. This lever is carried on a pivot pin 232 which is received in sockets formed in the prongs of the lever 229. Pivotal movement of the lever 229 causes the pivot pin 232 to describe an arc about the pivot pin 230. An arcuate slot 233 formed in the bell crank lever 231 to accommodate the pivot pin 230 permits pivotal movement of the bell crank lever on the pivot pin 232 while the lever 229 pivots on the pin 230.

The cutting wire 219 is disposed in a groove formed in a guide boss 234 on the body 226 and is formed with a loop 235 received on horn shaped end of arm 236 of the bell crank lever 231. The arm 236 is normally disposed in a position substantially parallel to the periphery of the reel, as shown in Fig. 11 and the tapered tip or horn shaped end thereof is curved away from the guide boss 234, as shown in Fig. 14, to prevent the wire loop 235 from slipping off during or after tensioning. The horn shaped tip of the wire holding lever eliminates the necessity for locating the wire loop in a particular position and expedites wire replacement. Arm 237 of the bell crank lever is formed at substantially a right angle with respect to the arm 236 and is disposed through a spring carrying member 238 extending from the body 226. A threaded adjusting screw 240 having a knurled thumb wheel 241 extends longitudinally through the member 238, guided by portions 242 and 243, and bears against the arm 237 of the bell crank lever. A compression spring 244 is disposed around the adjusting screw 240 in a recess of the member 238 between the guides 242 and 243. One end of the compression spring bears against the guide 242 and the other end against a nut 245 which has threaded engagement with the adjusting screw 240, and is restrained against rotation by engagement with the side walls of the recess in the member 238. The adjusting screw is thus urged against the arm 237 of the bell crank lever and tends to pivot the latter in a counterclockwise direction about the pivot pin 232, as viewed in Fig. 14, so as to tension the wire 219. In its normal position, illustrated by the solid lines in Fig. 14, the lever 229 is substantially parallel with the reel periphery (see Fig. 11). Upon movement of the lever 229 to the position indicated by the broken lines, the pivot pin 232 is carried in an arc about the pivot 230 and the bell crank lever is moved to the broken line position indicated. In this movement of the bell crank lever it pivots on the pin 232, on account of the latter moving away from the end of the spring-pressed adjusting screw 240, and the tension in the wire 219 is relieved.

The arms 236 and 237, in effect, straddle the body 226 of the wire holder, and the arrangement of the parts is such that, in moving the lever 229 between the full line and broken line positions of Fig. 14, a dead center position is passed which is substantially that at which the resultant of the forces exerted on the bell crank lever, by the compression spring 244 and the wire 219, passes through the pivot pin 230. Accordingly, the spring 244 serves the double function of locking the wire holder in closed or wire-tightening position and maintaining the proper tension in the wire. Additionally, the thumb wheels 241 are positioned so that the adjustment of the wire tension can be regulated while the machine is in continuous operation.

In the event that the lever 229 is moved to wire-releasing position for any reason, such as in replacing a broken wire, the tension on the wire is automatically restored to that which obtained before release upon movement of the lever 229 to closed position. This feature is of particular advantage, since it enables an operator to replace broken wires on the reel while the machine is in continuous operation. A number of wires of proper uniform length, having the loops 224 and 235 formed in their ends, are maintained in readiness. When the operator sees that a wire is broken he reaches into the center of the reel at one of its non-rotational or dwell periods and slips the loop 224 onto the hook 222 of the central spider, positioning the wire under the guide lug 223. At the next dwell period of the reel the loop 235 at the other end of the wire is slipped over the horn end on the arm 236 of the wire holder. The lever 229, which the operator previously released with his free hand when he was placing the loop 224 on the hook 222, is then moved to closed position, tightening the wire.

In the event that any levers 229 should inadvertently move to open wire-releasing position, or if the operator should fail to lock the wire holders after replacing a wire, means is provided for automatically performing this function. As shown in Fig. 11, the levers 229 extend radially from the reel when in wire-releasing position. A bar 246 (see Fig. 1) extending between the uprights 104 and 105, and adjacent the outer periphery of the gear rings 201 and 202, is arranged to engage any lever 229 which is in wire-releasing position and move it to closed wire-tightening position. If any of the levers 229 should become released while the wire is cutting the clay and after passing the bar 246, the reel drive shaft performs a similar function, as shown in Fig. 11, and moves the lever 229 to lock the wire holder, so that it is in readiness for the next cutting operation.

After cutting the clay on the platens 118 and 119 the wires are engaged by cleaners 247 (Fig. 11), carried by platen brackets 117, which deflect and suddenly release the individual wires, causing them to snap to clear and dislodge particles of clay, thus maintaining the wires in a clean condition for their next cutting operation.

Rotation of the reel is effected by a reel drive motor 250 mounted on the carriage and connected to drive shaft 251 journaled in bearings 252 secured to the carriage frame. A flexible coupling 253 is provided between the motor shaft and drive shaft 251 to absorb shocks and accommodate slight misalignment of the shafts. Gears 254 are secured to drive shaft 251 and mesh with teeth 255 formed on the outer peripheries of the gear rings 201 and 202.

The end of the drive shaft 251, opposite the motor 250, extends beyond the bearing 252 and has secured thereon a brake drum 256. A brake band 257 embraces the brake drum and has its ends secured to the carriage frame by bracket 258 and spring 259. The brake assembly is arranged so that when the motor 250 is driving the reel B in a forward or clay cutting direction the brake band on the drum 256 pulls against the resistance of the spring 259 which yields and diminishes the braking force, so as not to objectionably interfere with rotation of the reel. If the reel should rotate in the reverse direction, or backlash, causing rotation of the shaft 251 in the opposite direction, the drag of the brake band is resisted by the fixed bracket 258 and the band exerts a braking force on the drum and shaft to stop the reel. In this case the spring 259 serves to retain the brake band in frictional engagement with the brake drum.

A zero speed switch 261 is mounted on the carriage and is connected to the shaft of the reel drive motor 250. This switch is of conventional design and is arranged to open a circuit (to be later described) upon the reel drive motor 250 coming to a stop, such as would occur if the motor were driven in one direction and then a reversing current supplied thereto.

The present invention includes a control system for brick cutting machines which minimizes mechanical shock to the mechanism and insures that the reciprocating carriage is accurately synchronized with the moving clay column during the work stroke while the cutting operation is performed by the rotating reel. The start of the work stroke of the carriage and the rotation of the cutting reel are initiated in response to movement of the clay column by a measuring roller 301 carried in the housing 60 and arranged so that the clay bar or column rides thereon as the clay moves onto the carriage of the machine. This roller is mounted on a shaft 302 journaled in bearings 303, preferably of ball bearing construction, to minimize friction, so that the roller 301 quickly responds to variations in speed of the moving clay column E. The shaft 302 has a reduced diameter end portion which extends through one of the bearings 303 and carries a spring-pressed friction disk 304 axially slidable thereon and secured against relative rotation by key 305. A friction wheel 306, provided with a suitable facing 307 of leather or the like, is splined by a longitudinally extending key (not shown) to a shaft 308 disposed at right angles to the measuring roller shaft 302. A compression spring 309 is disposed about the hub of the friction disk 304 between a washer 310, bearing against the shoulder formed by the reduced diameter portion of the shaft 302, and the rear side of the friction disk, to maintain the latter in frictional engagement with the facing 307 of the friction wheel 306. A partition 311 forms a chamber 313 in the housing 60 for the measuring roller 301 and carries the bearing 303 which supports the friction disk end of the shaft 302. If desired, the chamber 313 is filled up to the level of the shaft with a suitable oil, such as kerosene, in which the measuring roller 301 is partially immersed, thus lubricating the bottom of the clay bar.

Opposite ends of hub 312 of the friction wheel 306 are engaged by arms 314 of guide member 315 which embraces the friction wheel and is carried on threaded shaft 316 extending in parallel relation to the shaft 308 through the housing 60. One end of the shaft 316 extends through the housing and has secured thereon a hand wheel 317 by means of which the shaft may be rotated to move the guide member longitudinally of the shaft 308 and adjust the position of the friction wheel 306 with respect to the friction disk 304. Longitudinal movement of the threaded shaft 316 is resisted by collars 318 secured thereto on opposite sides of the wall of the housing 60 in which the shaft is journaled.

The friction wheel shaft 308 is mounted in journals 319, preferably of ball bearing construction. One end of the shaft 308 extends through a partition 320 in the housing 60 into a contact chamber 321 and carries a contact disk 322 of non-conducting material, such as Bakelite or fibre. This disk is secured for rotation with the shaft 308 between flanged hubs 323 and 324.

The contact disk 322 carries contact ring 326 and contact segments 327 and 328, concentric with the shaft 308, and preferably embedded in the disk, so as to be flush with the surface thereof, the ring and segments being connected together by bus bar 329 (Fig. 18).

A stub shaft 330 is mounted in the housing 60 in alignment with the friction wheel shaft 308 and carries brush holders 331 and 332 retained in position by spacers 333 and washer 334. The brush holder 331 carries two brush assemblies 336 and 337 which include spring-pressed brushes arranged to contact ring 326 and segment 327, respectively. Brush holder 332 carries a brush assembly 338 which includes a spring-pressed brush arranged to contact the segment 328. Both brush holders are rotatable on the stub shaft 330 so as to be movable to various positions with respect to one another and the contact disk 322. Individual adjustment for the brush holders is provided by adjusting rods 339 and 340, connected to arms 341 and 342, respectively, of the brush holders. The rods 339 and 340 extend through the housing 60 and have threaded ends engaged by adjusting thumb wheels 343 and 344, respectively, for selectively moving the rods longitudinally with respect to the shaft 308. The brush assemblies 336, 337 and 338 are connected by flexible conduits 345 to the terminals 346, 347 and 348, respectively. The arrangement of the brush holders is such that the brush assemblies are normally below the level of the stub shaft 330 and friction wheel shaft 308, and are immersed in a suitable liquid, such as transformer oil, indicated at 350, which fills the contact chamber 320 below the shafts 308 and 330 in order to prevent arcing between the brushes and contacts on the disk 322.

Rotation of the measuring roller 301, effected by the movement of clay column E onto the carriage B, rotates the contact disk shaft 308 through the frictional engagement of the friction disk 304, carried on the measuring roller shaft, by the friction surface of the wheel 306. Movement of the friction wheel 306 to engage the friction disk 304 at various radial distances from the shaft 302 regulates the relation between the rotation of the measuring roller shaft 302 and the contact disk shaft 308. As will later appear, the contact disk 304 makes a single revolution for each operating cycle of the machine. The number of revolutions of the measuring roller required to drive the contact disk through a single revolution depends upon the position of the friction wheel 306 with respect to the disk 304. When the wheel contacts the disk close to the shaft 302 a greater number of revolutions of the measuring roll are required to complete one revolution of the contact disk 322 than when the wheel 306 engages the disk 304 adjacent the periphery, as shown in Fig. 16. Between these extreme positions, close adjustment is possible by means of the threaded shaft 316 and handwheel 317. It can be made while the machine is in continuous operation.

The terminal 346 is connected to one line of a three-phase electric power source, which is thus connected to the contact ring 326 through the brush assembly 336. Accordingly, upon rotation of the contact disk 322 the current is carried from the contact segments 327 and 328, energized through the bus bar 329, to the brush assemblies 337 and 338, and thence to the terminals 347 and 348 to start the carriage and reel drive motors, as will be later described.

At the end of a work stroke the movement of the carriage actuates a two-position or double-circuit limit switch 352 (Figs. 19 and 21), which has an arm 353 carrying a cam roller 357 engaged by a cam 354 adjustably mounted on the carriage by cam supporting members 355 and 356. The movement of arm 353 of the limit switch 352 is shown in Fig. 21, in which the broken lines indicate the relative positions of the parts at the instant the cam roller 357 is engaged by the cam 354, and the solid lines indicate the relative position of the parts at the instant the limit switch 352 is actuated to alter the circuit controlling the carriage motor, as will be later described. Further movement of the cam 354 to the left, as viewed in Fig. 21, pivots the arm 353 through a lost motion path provided in the switch 352.

At the end of the return movement of the carriage a three-position, double-circuit limit switch 358 is actuated by an arm 359 carrying a cam roller 367 engaged in succession by a pair of cam members 360 and 361 adjustably mounted at the infeed end of the carriage beneath the return movement cam supporting members 355 and 356. Cam members 360 and 361 are carried by an angle member 362 secured to the carriage frame. Cam member 360 is adjustable by means of an elongated slot 363 in the bracket member 362 which receives holding stud 364. A stud 365 secures the cam member 361 to the cam member 360 and adjustment between the two cams is afforded by means of elongated slot 366 in the cam member 361. Thus, each cam is adjustable with respect to the other, and both are adjustable with respect to the carriage. The arm 359 of limit switch 358 has three positions indicated in Fig. 22. One position, in which the limit switch closes a brake releasing circuit, is indicated by the circle 368, which represents the outline of the cam roller out of engagement with both cams. The full line circle 369 indicates the position of the cam roller when engaged by cam 360, and the switch opens both circuits. Broken line circle 370 indicates the position of the cam roller when engaged by the cam 360, and the switch shorts out the rheostat 68, as will be later described.

After each cutting operation the reel drive motor 250 is stopped through a limit switch 372 (Fig. 23), mounted on upright 107 of the carriage, as shown in Fig. 9, and actuated by an arm 373 having a cam roller 374 which extends in the path of cams 375, one of which is provided for each bank of cutting wires. These cams are adjustably mounted on the gear ring 202 by means of cam holding brackets 376, having elongated slots 377 which receive fastening bolts 378. The cams 375 are secured to a laterally extending leg of the brackets 376 by any suitable means, such as welding. The movement of the cams 375 past the limit switch 372 effects a three-position movement of the switch arm 373. In its normal position the cam roller is out of engagement with the cam, as indicated by the broken line circle 379, and the limit switch is included in a circuit for energizing the reel drive motor in a forward direction. In the first movement of the switch 372, effected by the initial engagement of the cam roller 374 by the cam 375, the arm 373 is moved to a position represented by the full lines of Fig. 23 and the limit switch is opened or neutral. The switch arm 373 remains in this position while the roller 374 moves over a portion of the cam surface indicated at 381, which is concentric with respect to the axis of the reel, and the cutting reel and drive motor coast. A raised portion 382 of the cam 375 then engages the cam roller 374 and moves it to the position indicated by the broken line circle 383, which corresponds to the third position of the limit switch 372, in which the switch is included in a circuit for energizing the reel drive motor in a reverse direction.

The operation of the machine will be described in connection with the wiring diagram (Fig. 25) and the diagrammatic views (Figs. 26 through 32). After a work stroke, the carriage drive motor 79 is energized to return the carriage to starting position through a magnetic control switch or relay 400, located in the panel box 74, and is energized during a work stroke through a magnetic control switch or relay 401, also in the panel box 74, and connected in series with the rheostats 68, 69 and 70 in the casing 67. The reel drive motor 250 is energized during a forward or cutting movement of the reel through a magnetic control switch or relay 402, and through a magnetic control switch or relay 403 to stop the reel movement. The relays 402 and 403 are enclosed in the cabinet 129, previously mentioned, mounted on the rear of the carriage over the motor 250. In the embodiment illustrated, both the carriage drive motor and reel drive motor are of the three-phase induction type and are energized from the three-phase circuit comprising the conductors 405, 406 and 407. The conductor 406 is connected through the main control switch 71 and line 408 to terminal 346 on the measuring roll housing 60, thus energizing the contact segments 327 and 328 on the contact disk 322 when the switch 71 is closed. The spring-pressed brushes in the brush assemblies 337 and 338, are associated with the contacts 327 and 328, are connected through the wires 345 and the terminals 347 and 348 with lines 410 and 411, respectively, which lead to magnetic or solenoid coils 414 and 415 arranged to actuate the armatures of magnetic switches 402 and 401. The other ends of the switch actuating solenoid coils are connected to line 407 of the three-phase circuit.

In an installation of the brick cutting machine, such as is shown diagrammatically in Figs. 26 to 32, the support members 1, 2, 3 and 4 of the base A are secured to a foundation F with the carriage B in substantially correct alignment with the mouth of an auger or extruder D. The base of the machine is then moved by the adjusting shafts 6 and 35, so that the carriage platens 118 and 119 are in correct alignment with the auger mouth to receive, support and guide clay bar column E issuing from the auger D. The clay bar is, of course, relatively plastic and soft, so that it is desirable to have perfect alignment of the parts which support it to avoid deformation and distortion.

Fig. 26 shows the carriage B at its extreme limit of movement to the left and ready to commence a work stroke. The cam roller 367 of the limit switch 358 is held in the position 370 by the cam 360, and the releasing solenoid in the motor brake 133 is not energized so that the brake keeps the motor from turning and holds the carriage while the clay bar is forced over the measuring roller 301, and onto the platens of the carriage B by the auger machine D. The reel C (Fig. 27) has been stopped following the previous cutting movement with the wires 219 clear of the clay bar path.

As the contact disk 322 is rotated by the measuring roller 301 through the friction disk 304 and friction wheel 306, the segments 327 and 328 approach the brush assemblies 337 and 338. The friction wheel is adjusted by means of the handwheel 317, so that just as the segment 328 contacts the brush 338 a short length of the clay bar extends beyond the path of the last cutting wire and onto the discharge apron 120 beneath the clamp 124. The short length of clay bar is known as a waste slab, since it is engaged by the clamp 123 during one work stroke of the carriage and by the clamp 124 during the succeeding work stroke. Adjustment of the friction wheel 306 regulates the length of the waste slab and can be done without stopping the machine.

When the friction disk 322 is rotated to substantially the position indicated in Fig. 27, and depending upon the adjustment of the brush holders 331 and 332, the segment 328 contacts the brush 338 and the solenoid 415 is energized to close the armature of relay 401, completing the circuit of the carriage drive motor 79 through contacts 416, 417 and 418, the current for the motor flowing through lines 419, 420 and 421 to the rheostats 69 and 70 and the limit switch, and through lines 422, 423 and 424 from the switch and rheostats to the motor.

A fourth contact 426 in the magnetic switch 401 completes a circuit between the main line 406 and the solenoid of the brake 133 on the carriage drive motor 79 through line 427, the other side of the brake being connected directly to main line 407. The brake thus energized is released to permit the motor 79 to drive the carriage B in a forward or work stroke, a movement to the left, as viewed in Fig. 2, and to the right, as viewed in Fig. 26, the reel C being in the position illustrated in Fig. 27.

A fifth contact 429 in the magnetic switch 401 connects the line 411 leading to the armature actuating solenoid 415 of the magnetic switch to the line 431 to limit switch 352, which completes the circuit to main line 406 through contact bar 432, this contact bar normally connecting the line 431 with the main line 406, except when the actuating arm 353 of the limit switch 352 is displaced by the cam 354. Thus, the relay solenoid 415 is energized through the line 431 to keep the relay 401 closed after the circuit through contact segment 328 and brush assembly 338 is broken by continued rotation of the measuring roller 301.

At the time the relay 401 is closed the carriage B is at the extreme left, as viewed in Fig. 26, and is held stationary by the brake 133. The cam roller 367 on the arm 359 of the limit switch 358 rests on the upper cam 360 in the position indicated by the circle 370 of Fig. 22 and in Fig. 25, so that the contact bar 428 of the limit switch 358 completes a circuit between lines 419 and 422, thus shorting the rheostat 68, and supplying full power to one phase of the carriage drive motor 79. In this manner the inertia of the carriage is overcome by the drive motor 132, so that the clay column E, moving onto the carriage from the extruding machine D, does not supply all the force required to start the carriage, the latter being given an initial impulse by the drive motor 79. The shorting of rheostat 68 supplies enough power to the drive means to jump the carriage ahead faster than the feed of the moving column so that substantially immediately at the start of the work stroke of the carriage it is moving at least as fast as the column to be cut. The contact bar 428 in the limit switch 358 retains the short across the rheostat 68 until the cam roller 367 rides off the cam 360 onto the cam 361 to the position represented by the circle 369 of Fig. 22. The resulting movement of the limit switch arm 359 carries the contact bar 428 to a neutral position, opening the short across the rheostat 68, so that all the power supplied to the motor 132 passes through the rheostats 68, 69 and 70, previously adjusted so that the carriage, in effect, floats over substantially the entire length of the work stroke after the initial jump impulse and the column of clay E does not supply all of the motivating force. Preferably, the adjustment of the rheostats is such that the carriage B, if it were not connected to the auger machine D by the clay column E, would normally tend to move very slowly to the right, as viewed in Fig. 26. However, the torque applied by the carriage drive motor 79 for this slow movement is relatively small and when there is no clay column or bar E connecting the carriage to the auger machine an operator is able to grasp the carriage B with his hands and hold it motionless, move it ahead, or draw it backward while the current for the motor 79 is supplied through the rheostats.

It is apparent that the carriage B, motivated over the work stroke by the drive motor 79 operating at reduced torque, is extremely sensitive to variations in speed of the clay column E. The frictional drag of the clay column on the platens 118 and 119 is considerably greater than the force required to increase or decrease the speed of the carriage B under normal operating conditions when the carriage is driven by the motor 79 operating at reduced torque. For different operating conditions it is contemplated that adjustment of the rheostats 68, 69 and 70, or any one of them, will compensate for variations in characteristics of feed of the clay column, so that the machine is adaptable to the different conditions encountered in manufacturing various types of brick and the like.

As the carriage continues to move on the work stroke, the cam roller 367 rides off the cam 361 and the arm 359 moves to the position indicated by the roller outline circle 368. This movement of the limit switch arm carries the contact bar 428 to the left, as viewed in Fig. 25, connecting lines 406 and 427 to maintain the energization of the solenoid of the motor brake 133. Thus, the brake is held inoperable until after the completion of a work and return stroke by the carriage and until the cam 361 moves the arm 359 to open the circuit between the lines 406 and 427 in the limit switch 358.

Shortly after the circuit for actuating the magnetic switch 401 is closed, and when the carriage is substantially in the position indicated by the full lines of Fig. 28, the time interval depending upon the adjustment of the brush holders 331 and 332, the brush 337 is engaged by segment 327, (see Fig. 29) closing a circuit between the main lines 406 and 407 through connecting lines 408 and 410 to energize the magnetic coil or solenoid 414, which closes the magnetic switch 402, having five contacts. This switch starts the reel drive motor to rotate the reel in a counter-clockwise direction from the starting position shown in Fig. 29. Contacts 435, 436 and 437 close the circuits for the reel drive motor 250, connecting main lines 405, 406, and 407 with lines 438, 439, and 440, respectively. Contact 441 closes the circuit for energizing the solenoids 128 of the clay bar clamps 123 and 124 by connecting the main line 406 with line 442 leading to one terminal of each of the solenoids; the other terminal of each solenoid is connected to main line 407. Contact 443 completes a circuit for the solenoid 414 through main line 406, line 444, and line 410, lines 444 and 410 being connected through contact bar 445 of limit switch 372, which normally connects the lines 410 and 444 when the lever arm 353 is in its normal position, indicated by the broken lines of Fig. 21, and until the cam 354 engages the cam roller and moves it to the full line position shown. In this manner the solenoid 414 continues to be energized to keep the magnetic switch 402 closed after the contact segment 327 moves away from the brush assembly 337.

While the reel C is rotated in a forward direction by the reel drive motor 250 to cut the clay column E and the carriage advances substantially to the full line position of Fig. 30, the solenoids 128 hold the clamps 123 and 124 in engagement with the top of the waste slab portions of the clay bar to press the latter against the bottom platen. As previously mentioned, the clamps assist in preventing relative movement between the column of clay and the carriage. Any movement which does occur is indicated by scoring of the waste slab so that the operator can adjust the rheostats and supply more or less power to the carriage drive motor to maintain synchronization between the carriage and the moving column.

As the cutting wires 219 are completing the cutting operation (Fig. 31) the cam roller 374, of the reel control limit switch 372, is engaged by one of the adjustable cams 375 and rides onto the cam surface 381 to the position indicated by the full lines in Fig. 23. This pivotal movement of the arm 373 of the limit switch 372 moves the contact bar 445 to neutral position and opens the circuit of the magnetic switch solenoid 414. All of the circuits controlled by the switch 402 are thus opened, releasing the clamps 123 and 124, which are retracted by the clamp springs, and permitting the reel C to coast. This occurs before the carriage reaches the end of a work stroke and when it is at an intermediate position, such as indicated in Fig. 30. Coasting of the reel occurs as it is completing the cutting operation or starts just after the completion of the cutting operation, depending upon the setting of the cams 375 each of which is adjusted by means of the bolt 378 in the elongated slot 377 of the cam holding bracket 376, as previously described.

When the coasting reel has moved so that the cam roller 374 moves onto the cam surface 382, the arm 373 is moved to the position represented by the broken circular outline 383 of the cam roller (Fig. 23) and the contact bar 445 of the limit switch 372 moves to complete a circuit through main line 407, magnetic coil 447 of reversing magnetic switch 403, lines 448 and 449, and zero speed switch 261, and main line 406. The reel reverse control switch has four contacts: 450, 451 and 452, which energize the reel drive motor 250 in a reverse direction in order to quickly arrest its forward movement by connecting the motor lines 438 and 439 and 440 with the main lines 406, 405 and 407, respectively, thus reversing the connections of lines 438 and 439, and fourth contact 453, which completes a circuit for the solenoid 447 through the zero speed switch 261. This contact thus connects lines 448 and 449, so that when the cam 375 moves away from the roller 374 and the contact bar 445 of the limit switch disconnects line 448 from line 449 the circuit including these lines remains closed through the contact 453 of the magnetic switch.

Immediately upon the reverse energization of the reel drive motor, effected through magnetic switch 403, causing the reel to stop its forward movement, the shaft of motor 250 comes to rest so that the zero speed switch 261 opens the circuit for the solenoid 447, thus opening the magnetic switch and deenergizing the reel motor. The reel C is thus brought to rest in a minimum time after completion of the cutting operation. Any reverse movement or backlash of the reel is resisted by the brake band 257, which grips the brake drum 256 on the reel driveshaft 251, as previously described.

Figure 32:
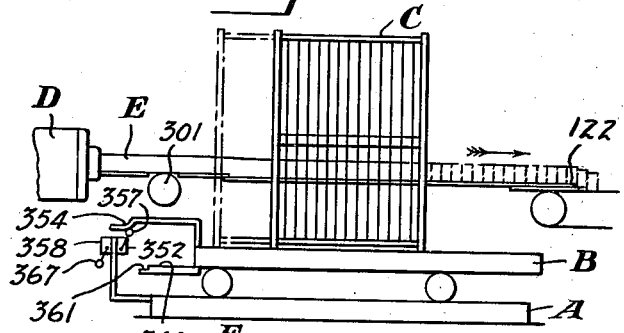

After completion of the cutting operation the carriage B continues its forward or work stroke to substantially the position shown in Fig. 32, and until the cam 354 engages the roller 357 of the limit switch 352 to move the roller to the full line position indicated in Fig. 21. This movement actuates the arm 353 and moves the contact bar 432 of the limit switch to connect main line 406 to line 455 which is connected to one side of electric solenoid 456. The other side of the solenoid is connected to main line 405. This solenoid actuates the armature of carriage return electro-magnetic switch 400, which has four contacts. Carriage drive motor 132 is energized to drive the carriage B in a return movement to the left, as viewed in Fig. 32, through contacts 457, 458 and 459, which connect the main lines 405, 406 and 407, respectively, with the motor lines 422, 424 and 423, thus reversing the connection of lines 405 and 407 to the motor with respect to what they are when the magnetic switch 401 is closed.

Fourth contact 460 of the switch 400 connects line 455 of the circuit for the electro-magnetic solenoid 456 to the line 427 which connects with main line 406 through the contact bar 428 of the limit switch 358. Thus, the relay 400 remains closed after the contact bar 432 of the limit switch 352 disconnects the lines 406 and 455 upon the cam roller 357 being disengaged by the cam 354. The return movement of the carriage is from substantially the position at which it comes to rest after a work stroke, such as that illustrated in Fig. 32, to substantially the position indicated in Fig. 26. Upon the cam roller 367 of the limit switch 358 being engaged by the cam 361 the contact bar 428 opens the circuit between main line 406 and line 427, so that the electric switch solenoid 456 is deenergized and the switch 400 opened. Simultaneously the magnetic release solenoid of motor brake 133 is deenergized and the brake operates to bring the carriage to rest and hold it in a substantially stationary position while a succeeding length of clay bar E is moved into position on the platens of the carriage. As the carriage is brought to rest after a return movement, the cam roller 367 of the limit switch 358 moves onto the cam 360 so that the contact bar 428 makes connection between lines 419 and 422, which shorts out the rheostat 68, and the machine is ready for another cycle as soon as the measuring roller moves the contact disk 322 so that contact segment 328 is engaged by the brush of brush assembly 338, and the lines 408 and 411 are connected to complete the circuit for magnetic switch solenoid 415 and start the carriage on another work stroke.

The control or limit switches employed in the mechanism described fulfill multiple functions: switch 358 serves as a means to govern the application of the carriage holding brake and simultaneously establish a connection for energizing the carriage drive means to give an initial impulse to the carriage at the beginning of a work stroke, so that the carriage and clay bar are quickly synchronized. Control means other than the switch 358 releases the carriage brake, the switch 358 becoming operative later in the cycle to hold the brake released substantially until the completion of the carriage return stroke. Thus, the single braking means is utilized for arresting the return movement of the carriage and for holding the carriage while a fresh length of clay bar moves onto the platens, the brake being applied in response to one control means and released in response to another control means.

Between the de-energizing of the reel C in a forward direction and the application of a braking force to arrest its forward movement, the reel is permitted to coast over a path of predetermined length to improve the operating characteristics of the machine and avoid abrupt stopping and starting. This coasting period can be utilized, if desired, to complete the cutting of the clay bar, so that the reel is substantially at rest when the cutting operation is completed, and only a relatively small braking or reverse driving force is required to wholly arrest the reel rotational movement.

In Figs. 33 and 34 is illustrated a modification of the invention in which the energization of the cutting reel movement is controlled in response to the carriage movement. Parts or elements specifically relating to this feature have been numbered in the 500's and parts previously described are identified by the same numerals of reference. The wiring diagram, Fig. 33, includes a diagrammatic representation of a single cycle switch or relay 500. This switch has a pair of electromagnets or solenoids 501 and 502 which actuate armatures 503 and 504, respectively. The armatures are pivotally connected to opposite ends of a snap action beam 505 which has a spring 506 fastened at the end of an arm 507 extending from centrally located pivot 508. By this arrangement the beam 505 and armatures 503 and 504 are held at either one limit of movement or the other. Contact bars 510, 511, and 512 are actuated by one of the armatures, in this case the armature 503. Contact bar 510 is arranged to make and break a circuit across terminals 514 and 515 while contact bar 511 closes the circuit across terminals 516 and 517, and contact bar 512 closes a circuit across terminals 518 and 519.

The contact bars are arranged on the armature 503 so that when the solenoid 502 is energized to move the beam 505 and the armatures into the full line position illustrated in Fig. 33, the contact bars 510 and 511 move to close a circuit across contacts 514 and 515, and 516 and 517, respectively; the contact bar 512 moving away from the contacts 518 and 519. Upon energizing the solenoid 501 the beam 505 moves to the broken line position and contact bar 512 closes the circuit across terminals 518 and 519; contact bars 510 and 511 breaking the circuits across terminals 514 and 515, and 516 and 517, respectively. The single cycle switch 500 is housed in a suitable box (not shown) mounted on the carriage, or in the panel box 129.

A limit switch 520 controls the energization of the solenoids of relay 500 and is mounted on the panel plate 77 alongside the limit switches 352 and 358 previously described. A cam bar 521 adjustably carried by the bracket 362 and located beneath the cam 361 engages cam roller 522 on the end of the lever arm 523 of the limit switch 520. When the carriage B is at the right, as viewed in Fig. 2, the roller 522 is engaged by the cam 521 and moved to the full line position illustrated in Fig. 33, carrying contact bar 525 of the relay to the left hand position to connect line 408 with the relay terminal 519 through line 526. The adjustment of the cam bar 521 is arranged so that the roller 522 moves to the broken line position of Fig. 33 shortly after the roller 367 of the limit switch 358 moves off the cam 360. This movement causes the contact bar 525 of the limit switch 520 to move to the right and connect line 408 with terminals 515 and 517 of the single cycle switch 500 through line 527.

Energization of the electromagnet or solenoid 414 of the switch 402 to start the reel drive motor 250 is initially effected through the limit switch 372, the contact bar 510 of the relay 500 and the limit switch 520. At the start of a work stroke of the carriage B which is initiated upon the energization of electromagnet 415 of switch 401 by brush assembly 338 contacting the segment 328, the limit switch 372 is set so that the contact bar 445 connects lines 410 and 444, and the relay 500 is set so that the contact bar 510 connects lines 444 and 527 which are secured to the terminals 514 and 515 respectively. As soon as the roller 522 moves off the end of cam 521 to the broken line position of Fig. 33, the contact bar 525 snaps to the right and connects line 527 with line 408, thus energizing the coil 414 through the lines 444 and 410. In this manner the cutting reel motor 250 is energized through the switch 402 and the cutting operation is started. Stopping of the reel drive motor, after the cutting operation, is accomplished through the limit switch 372 as previously described.

Simultaneously with the energization of the coil 414 the electromagnetic solenoid 501 of the single cycle relay 500 is energized through the contact bar 511 which is across the terminals 517 and 516 connected to the line 527 and one side of the coil 501, respectively. The opposite end of the solenoid coil 501 is connected to the main line 407. This energization of the coil 501 moves the armatures 502 and 503 and the beam 505 from the full line to the broken line position of Fig. 33, thus moving the contact bars 510 and 511 away from the terminals 514 and 515, and 516 and 517, respectively. In this manner the circuit through the relay or switch 500 for energizing the electromagnet 414 of the switch 402 is broken. The action of the relay 500 is slower than that of the electromagnetic switch 402 so that the latter has an opportunity to close and retain its self-energization through terminals 443 before the circuit through contact bar 510 is broken. The energization of the relay coil 501 also moves the contact bar 512 to the broken line position illustrated and the armatures and beam of the relay 500 remain in this position until after the completion of the cutting stroke and the return of the carriage B to starting position to receive a succeeding length of clay bar.

As the carriage approaches starting position, that is to say, at the extreme right as viewed in Fig. 2, the cam 521 moves the roller 522 to the right as viewed in Fig. 33 and the contact bar 525 moves from the broken line to the full line position completing the circuit through solenoid 502 of the relay 500 which includes contact bar 512 and line 526. The main line connections being through 407 and 408, the former being connected directly to the solenoid 502 and the latter being connected through the bar 525. The energization thus effected of the electromagnet or solenoid 502 moves the armatures 503 and 504 and the beam 505 from the broken line position to the full line position shown in Fig. 33. This movement carries the contact bar 512 away from the terminals 518 and 519, de-energizing solenoid 502. Simultaneously the contact bars 510 and 511 move to the full line position across the terminals 514 and 515, and 516 and 517, respectively, and the single cycle relay 500 is set to transmit current to the solenoid of the electromagnetic switch 402 upon the start of another work stroke of the carriage B.

This modification of the electrical control system is of particular advantage in preventing inadvertent operation of the cutting reel C. Unless the contact bar 510 is in the full line position shown in Fig. 33, in which it makes a connection across terminals 514 and 515, the limit switches 372 and 520 are ineffective to energize the solenoid 414 of electromagnetic switch 402. The armature 503, which carries the contact bar 510, is held in the broken line position illustrated, with the circuit across the terminals 514 and 515 broken, by the spring 506 until the carriage B is returned to starting position and the cam 521 moves the roller 522 to the full line position shown. Since the contact bars 510 and 511 move together and make and break their respective circuits at substantially the same time, current for initiating the start of the reel drive means through the electromagnetic switch 402 cannot flow through the switch or relay 500 until after a cyclic movement of the armatures 503 and 504 and the beam 505, so that the cutting reel C cannot be started until after the carriage B has returned to starting position.

The control arrangement illustrated in Figs. 33 and 34 is in effect embodied in a system including an element having two positions, the element being the armature 503 carrying the contact bars 510, 511, and 512. In its first position shown by the full lines of Fig. 33, the armature 503 permits starting of the cutter actuating motor 250 in response to the movement of the carriage B which causes a circuit to be completed through the contact bar 525 of the limit switch 520 upon the cam roller 522 being engaged by the cam bar 521. In the second position of the element or armature 503 which is indicated by the broken lines of Fig. 33, it prevents the starting of the cutter motor 250 until after actuation of the limit switch 520 at the completion of a carriage return movement.

The control means of limit switch 520 responsive to the carriage movement is arranged to not only set the armature element 503 of the relay 500 in the first and second positions described above according to the particular position of the carriage but also completes the circuit for energizing the coil 414 of the electromagnetic switch 402.

Other modes of applying and utilizing the principles of the invention may be employed, change being made as regards numerous details including alterations in both the design and construction, it being understood that the particular forms shown and described and the procedure set forth are presented for purposes of explanation and illustration.

What I claim is:

1. In a machine for cutting bricks, a cutter, drive means for the cutter, and means for controlling the energization of the drive means, said control means arranged to de-energize the drive means after a predetermined cutting movement of the cutter and to re-energize the drive means in a reverse direction after a predetermined additional coasting movement of the cutter to positively arrest the cutter.

2. In a machine for cutting a moving clay column, a reciprocable carriage, a substantially horizontal clay-supporting platen on the carriage, a substantially vertical clay-guiding platen on the carriage, a base having means for supporting the carriage, said base including members adapted to be rigidly secured to a foundation for the machine, means associated with the base for adjusting the support means to shift the platens vertically and laterally while the base remains secured to said foundation, and means for retaining the machine in adjusted position.

3. In a machine for cutting a moving clay column, a reciprocable carriage having a receiving end and a discharge end, a supporting platen on the carriage, a base for supporting the carriage, said base including members adapted to be rigidly secured to a foundation for the machine, means associated with the base for individually adjusting the height of the platen at the receiving end of the carriage, and means associated with the base for individually adjusting the height of the platen at the discharge end of the carriage, said adjusting means forming part of the base structure at both ends thereof and being operable while the base remains secured to the foundation.

4. In a machine for cutting a moving clay column, a reciprocable carriage having a receiving end and a discharge end, a substantially vertical clay-guiding platen on the carriage, a base for supporting the carriage, said base including members adapted to be rigidly secured to a foundation for the machine, means associated with the base for individually adjusting the receiving end of the carriage laterally to align one end of the platen with the clay column, and means associated with the base for individually adjusting the discharge end of the carriage laterally to align the other end of the platen with the clay column, said adjusting means forming part of the base structure at both ends thereof and being operable while the base remains secured to the foundation.

5. A machine for cutting a continuously advancing column of plastic material comprising a supporting structure, a reciprocable carriage to receive the column, mounted on the supporting structure and having a work stroke and a return stroke, an intermittently operable cutter mounted on the carriage and reciprocable therewith, motor drive means for the carriage, motor drive means for the cutter separate from the carriage drive motor, measuring means actuated by the column to measure the latter, starting control means for the carriage drive motor responsive to the measuring means, starting control means for the cutter motor separate from said carriage control and responsive to said measuring means, and means for adjusting the cutter control with respect to the carriage control to vary the time interval between the start of the carriage motor and the start of the cutter motor.

6. A machine for cutting a continuously advancing column of plastic material comprising a supporting structure, a reciprocable carriage to receive the column, mounted on the supporting structure and having a work stroke and a return stroke, an intermittently operable cutter mounted on the carriage and reciprocable therewith, motor drive means for the carriage, motor drive means for the cutter separate from the carriage drive motor, measuring means actuated by the column to measure the latter, starting control means for the carriage drive motor responsive to the measuring means, starting control means for the cutter motor separate from said carriage control and responsive to said measuring means, means for adjusting the cutter control with respect to the carriage control to vary the time interval between the start of the carriage motor and the start of the cutter motor, and means for simultaneously adjusting both said controls with respect to the measuring means to vary the length of column received by the carriage prior to starting the drive motors.

7. A machine for cutting a continuously advancing column of plastic material comprising a supporting structure, a reciprocable carriage to receive the column, mounted on the supporting structure and having a work stroke and a return stroke, an intermittently operable cutter mounted on the carriage and reciprocable therewith, motor drive means for the carriage, motor drive means for the cutter separate from the carriage drive motor, measuring means actuated by the column to measure the latter, starting control means for the carriage drive motor responsive to the measuring means, starting control means for the cutter motor separate from said carriage control and responsive to said measuring means, means for adjusting the cutter control with respect to the carriage control to vary the time interval between the start of the carriage motor and the start of the cutter motor, and stopping control means for the cutter motor responsive to the cutter movement to arrest the cutter drive after each cutting operation independently of the carriage drive motor.

8. In a machine for cutting a continuously advancing column of plastic material, a supporting structure, a reciprocable carriage for receiving the advancing column mounted on the supporting structure, an intermittently operable cutter on the carriage, said carriage arranged to receive a length of the column at a starting position and move with the said length of column over a work stroke, during which the cutter severs the length of received column, and the carriage arranged to then return to the starting position to receive a succeeding length of the advancing column, and a control for governing the operation of the machine comprising a rotatable member actuated by the advancing column, a movable electrical contact rotated by said member, a second electrical contact arranged to engage the movable contact at a predetermined point in the path of said movable contact, and means for moving one of said contacts relative to the other without moving the rotatable column-engaging member to adjust said point of contact relative to the rotatable member.

9. In a machine for cutting a continuously advancing column of plastic material, a supporting structure, a reciprocable carriage for receiving the advancing column mounted on the supporting structure, an intermittently operable cutter on the carriage, said carriage arranged to receive a length of the column at a starting position and move with the said length of column over a work stroke, during which the cutter severs the length of received column, and the carriage arranged to then return to the starting position to receive a succeeding length of the advancing column, and a control for governing the operation of the machine comprising a rotatable member actuated by the advancing column, a contact member having a driving connection with the rotatable member to be actuated thereby, a movable electrical contact element carried by said contact member, a second electrical contact element arranged to engage the movable element at a predetermined point in the path of the movable element, and means for adjusting said driving connection to vary the speed ratio between the rotatable member and the contact member.

10. A rotatable reel for cutting a continuously advancing column of plastic material comprising two or more spaced rings mounted for rotation about the reel axis in substantially parallel planes, connecting members extending between the rings, supporting elements for the rings, and flange means engageable with side portions of only one of said rings to restrict axial movement thereof, the other or others of said rings being restrained against axial movement solely through the connecting members.

11. A rotatable reel for cutting a continuously advancing column of plastic material comprising a pair of spaced rings arranged for rotation about the reel axis in substantially parallel planes, connecting members extending between the rings for rotation of the rings as a unit, rotatable elements for supporting the rings, the elements for one ring permitting axial movement thereof and the elements for the other ring having flanges engageable with opposite side portions of the said ring to restrict axial movement of the reel, and means for adjusting the distance between the flanges to compensate for wear of the ring and to prevent axial play in the reel.

12. A rotatable reel for cutting a continuously advancing column of plastic material comprising a pair of spaced rings arranged for rotation about the reel axis in substantially parallel planes, connecting members extending between the rings for rotation of the reel as a unit, and means engaging only one of the rings to restrict axial movement of the reel, the other ring having substantially unrestricted axial movement whereby axial movement of the reel is controlled by only one ring.

13. A machine for cutting a continuously advancing column of plastic material, comprising a supporting structure, a carriage for receiving the column and moving therewith, a pair of spaced wheels interposed between the structure and carriage at each end thereof, a shaft for each pair of wheels, one of the wheels of each pair being freely movable toward and away from the other on their shaft, individual pairs of V-shaped tracks for each of the wheels, one track of each pair being on the supporting structure and the other on the carriage, and V-shaped peripheries on the wheels riding on the V tracks, one track of each pair being laterally adjustable to permit horizontal movement thereof with the other track of such pair independently of the other wheels and tracks.

14. A machine for severing a moving plastic column, comprising a carriage reciprocable over work and return strokes, a cutter, means on the carriage for supporting the column, means for actuating the cutter during the work stroke of the carriage to sever the supported column, and drive means other than and wholly independent of the column for applying a force to the carriage to move the same with the column during the entire column severing movement of the cutter, said drive means being arranged to apply a force to the carriage substantially of sufficient magnitude to move the carriage alone and of insufficient magnitude to overcome the frictional restraint of the plastic column and move the carriage relative thereto, whereby the movement of the carriage is synchronized with that of the plastic column during the severing operation.

15. A machine for severing a moving plastic column, comprising a carriage movable with the column, means on the carriage for supporting the column, a cutter, means for actuating the cutter to sever the supported column, and drive means independent of the column for applying a substantially constant force to the carriage to move the same with the column during the entire column severing movement of the cutter.

16. A machine for severing a moving plastic column, comprising in combination a carriage reciprocable cyclically over work and return strokes for receiving the column, means for severing the column during the work stroke, an electric motor for driving the carriage, a source of electric current for the motor, and means for connecting the motor to said current source, said connecting means including a control responsive to the movement of the column for connecting the motor to the source to operate in one direction and drive the carriage over substantially the entire work stroke and a control responsive to the carriage movement for reconnecting the motor to the current source for reverse operation to drive the carriage over the return stroke whereby the carriage is driven substantially throughout its cycle by the motor.

17. A machine for severing a moving plastic column, comprising in combination a carriage reciprocable cyclically over work and return strokes for receiving the column, means for severing the column during the work stroke, an electric motor for driving the carriage, a source of electric current for the motor, and means for connecting the motor to said current source, said connecting means including a control responsive to the movement of the column for connecting the motor to the source to operate in one direction and drive the carriage over substantially the entire work stroke and a control responsive to the carriage movement for reconnecting the motor to the current source for reverse operation to drive the carriage over the return stroke whereby the carriage is driven substantially throughout its cycle by the motor, and the connecting means including means for reducing the power output of the motor during one stroke of each cycle relative to the power output during the other stroke.

18. In a machine for severing a moving column of plastic material, a carriage for receiving the column and moving therewith, a movable cutter, an electric motor for actuating the cutter, a source of electric current for the motor, and control means, said control means including magnetic switch means for connecting the motor to said current source to operate the motor, and means responsive to the cutter movement for actuating the switch means to disconnect the motor from the current source and to reconnect the motor to the current source for an instant to give a reverse impulse to the motor and to thereby suddenly stop the cutter movement.

19. In a machine for severing a moving column of plastic material, a carriage for receiving the column and moving therewith, electric motor means for driving the carriage while so moving, a cutter, electric motor means for actuating the cutter to sever the column, electrically operable switches having connections for connecting the carriage and cutter motors to the current source, and control means responsive to the movement of the column, said control means including a first pair of contacts having connections for operating the carriage motor switch for starting the drive means, a second pair of contacts having connections for operating the cutter motor switch for starting the actuating means, and means for operating the contacts including means for varying the time interval between the starting of the drive means and the starting of the actuating means.

20. In a machine for severing a moving column of plastic material, a carriage for receiving the column and moving therewith, means for holding the carriage while the column is received thereon, a cutter, means for actuating the cutter to sever the column, and control means responsive to the movement of the column, said control means including means for operating the holding means to release the carriage for movement with the column, means for starting the cutter actuating means, and means for varying the time interval between the release of the carriage and the actuation of the cutter.

21. In a machine for severing a moving column of plastic material, a cyclically reciprocable carriage for receiving the column and moving therewith, a cutter, an electric motor for driving the cutter, a source of electric current, means including a switch for connecting the motor to the current source to operate the motor, and means for controlling said switch, said control means comprising means responsive to the movement of the carriage for closing said switch, and means responsive to the movement of the carriage for preventing closing of the switch by the switch closing means more than once during each cycle of the carriage.

22. In a machine for severing a moving column of plastic material, a cyclically reciprocable carriage for receiving the column and moving therewith, a cutter, an electric motor for driving the cutter, a source of electric current, means including a switch having an electric actuator and connections for connecting the motor to the current source to operate the motor, and means for controlling said switch, said control means comprising a first limit switch responsive to the movement of the carriage and having connections for connecting the switch actuator to the current source to close the motor connecting switch, a second limit switch responsive to the movement of the cutter and having connections for opening the motor connecting switch, and a single cycle switch interposed in the connections between the first limit switch and the motor connecting switch to prevent closing of the motor connecting switch more than once during each cycle of the carriage.

23. In a machine for severing plastic material, a frame structure, a cutter comprising a movable supporting member, a holder carried by said member, a cutting element having one end anchored to the structure and the other end attached to the holder, said holder including a pivotally mounted tensioning lever movable between a position in which the cutting element is placed under tension thereby and a position in which tension in said element is released, and a member on the frame structure disposed adjacent the path of the supporting member and arranged to engage said lever to move the same from released position to tensioned position during movement of the supporting member.

24. In clay cutting machine construction, in combination, a carriage having horizontal and vertical platens to support and guide a moving clay column received from an extruding device, a base assembly having track means to support the carriage for reciprocable movement and supports adapted to bear on a permanent foundation, and adjusting means forming part of the base assembly for shifting the track means horizontally and vertically without moving the supports to thereby alter the corresponding positions of the platens and align the platens with the extruding device.

25. In a clay cutting machine, a supporting structure, a cutting reel comprising a pair of spaced, substantially parallel circular rings, means connecting the rings, means mounting the rings for rotation as a unit about an axis passing through their centers, and means engaging only one of the rings for restraining movement of the reel along said axis, the other ring being unrestrained axially by the mounting means.

26. In a machine for cutting a continuously advancing column of plastic material, a supporting structure and a reciprocable carriage thereon, drive means on the structure and having connection with the carriage for actuating the latter, said connection including a rack and pinion combination in which an end tooth of the rack is engaged by the pinion at one limit of movement of the carriage, and resilient means in said connection permitting longitudinal movement of the rack relative to the carriage, whereby said end tooth ratchets on the pinion upon continued rotation of the latter with the carriage at said limit of movement.

ELWIN A. HAWK.